United States Patent
Izawa et al.

(10) Patent No.: US 8,111,946 B2
(45) Date of Patent: Feb. 7, 2012

(54) IMAGE PROCESSING APPARATUS, IMAGING APPARATUS, AND IMAGE PROCESSING METHOD

(75) Inventors: Katsutoshi Izawa, Miyagi (JP); Makoto Oishi, Miyagi (JP); Takeshi Misawa, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 807 days.

(21) Appl. No.: 12/235,412

(22) Filed: Sep. 22, 2008

(65) Prior Publication Data
US 2009/0087123 A1    Apr. 2, 2009

(30) Foreign Application Priority Data

Sep. 28, 2007  (JP) ................................ 2007-256764

(51) Int. Cl.
*G06K 9/32* (2006.01)
(52) U.S. Cl. ........ 382/284; 382/282; 382/294; 358/540; 358/450; 345/640
(58) Field of Classification Search .................. 382/282, 382/284, 294; 358/537, 540, 450; 345/629, 345/640
See application file for complete search history.

(56) References Cited

U.S. PATENT DOCUMENTS

| | | | |
|---|---|---|---|
| 6,345,130 B1 * | 2/2002 | Dahl | 382/286 |
| 6,556,243 B1 | 4/2003 | Dotsubo et al. | |
| 6,874,420 B2 * | 4/2005 | Lewis et al. | 101/485 |
| 6,919,892 B1 * | 7/2005 | Cheiky et al. | 345/473 |
| 6,990,480 B1 * | 1/2006 | Burt | 1/1 |
| 7,027,054 B1 * | 4/2006 | Cheiky et al. | 345/473 |

FOREIGN PATENT DOCUMENTS

| | | |
|---|---|---|
| JP | 11-004403 A | 1/1999 |
| JP | 2000-022927 A | 1/2000 |
| JP | 2000-209500 A | 7/2000 |
| JP | 2004-030117 A | 1/2004 |
| JP | 2004-297274 A | 10/2004 |
| JP | 2007-172271 A | 7/2007 |

OTHER PUBLICATIONS

Notice of Reasons for Rejection, dated Jun. 13, 2011, issued in corresponding JP Application No. 2007-256764, 6 pages in English and Japanese.

* cited by examiner

*Primary Examiner* — Yosef Kassa
(74) *Attorney, Agent, or Firm* — Sughrue Mion, PLLC

(57) ABSTRACT

An image processing apparatus, comprising:
 a storage device which stores an image for insertion;
 an image acquisition device which acquires a background image forming a background of the image for insertion;
 an object recognition device which recognizes at least one object from the acquired background image and acquires object information including a position of the object;
 an image processing device which image-processes the image for insertion based on the object information to appropriately combine the image for insertion into the background image; and
 an image synthesis device which combines the processed image for insertion into the background image.

29 Claims, 14 Drawing Sheets

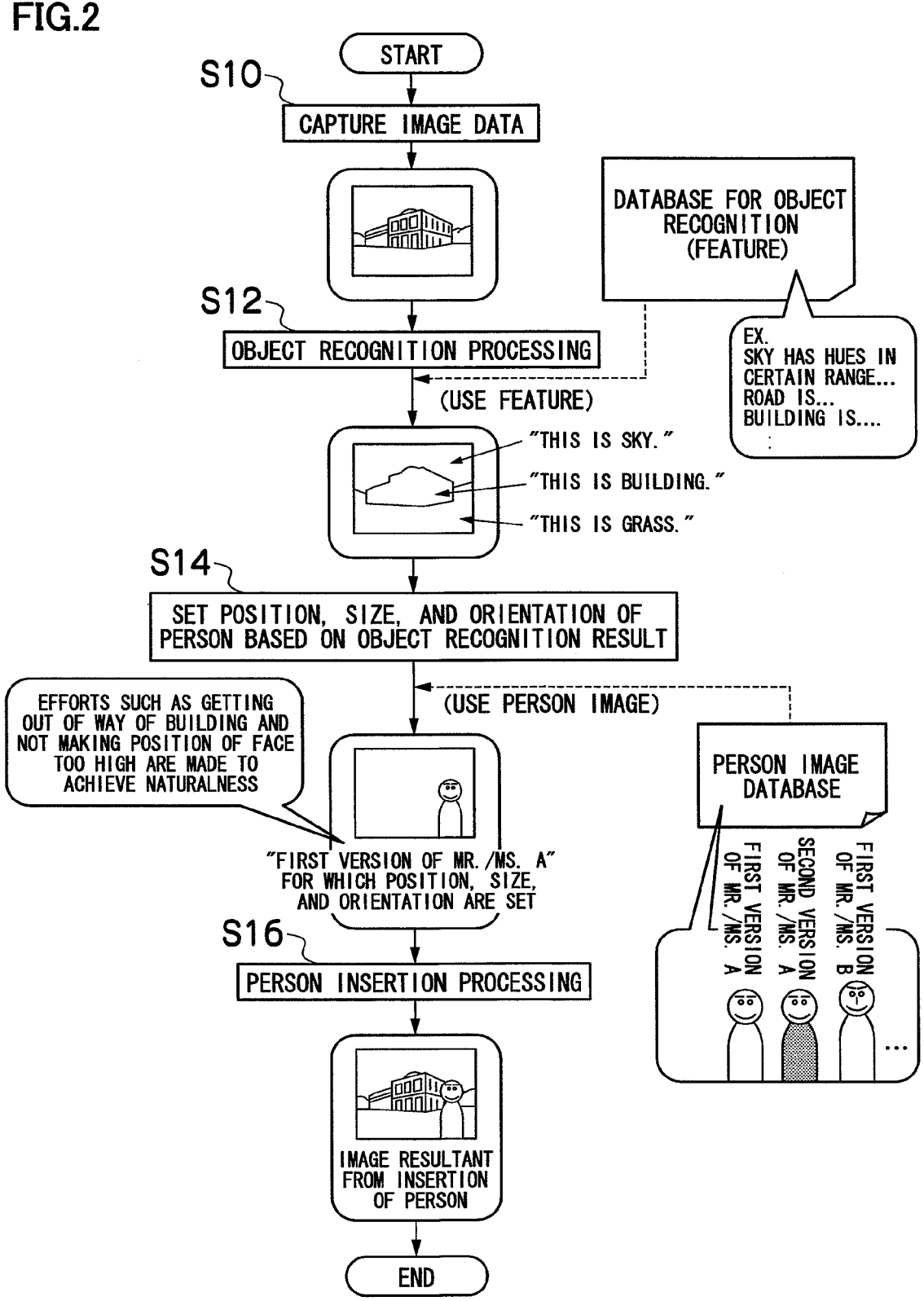

FIG.4

FOR EXAMPLE, FOLLOWING FEATURES ARE EXTRACTED FROM OBJECT RECOGNITION RESULT:

FEATURE 1: TOTAL NUMBER OF PIXELS OF SKY
FEATURE 2: TOTAL NUMBER OF PIXELS OF SEA
FEATURE 3: TOTAL NUMBER OF PIXELS OF GROUND
FEATURE 4: TOTAL NUMBER OF PIXELS OF GRASS
FEATURE 5: BILATERAL SYMMETRY OF COMPOSITION
FEATURE 6: OBJECT OCCUPYING LARGEST PART OF LOWER HALF OF SCREEN
FEATURE 7: PERCENTAGE OF OBJECT OCCUPYING LARGEST PART OF LOWER HALF OF SCREEN [%]
FEATURE 8: OBJECT OCCUPYING LARGEST PART OF CENTER OF SCREEN
FEATURE 9: PERCENTAGE OF OBJECT OCCUPYING LARGEST PART OF CENTER OF SCREEN [%]
...

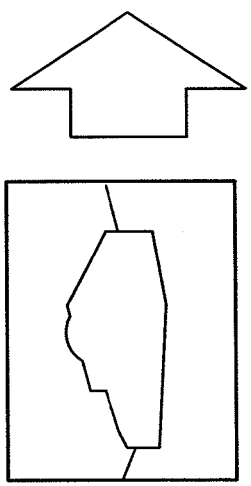

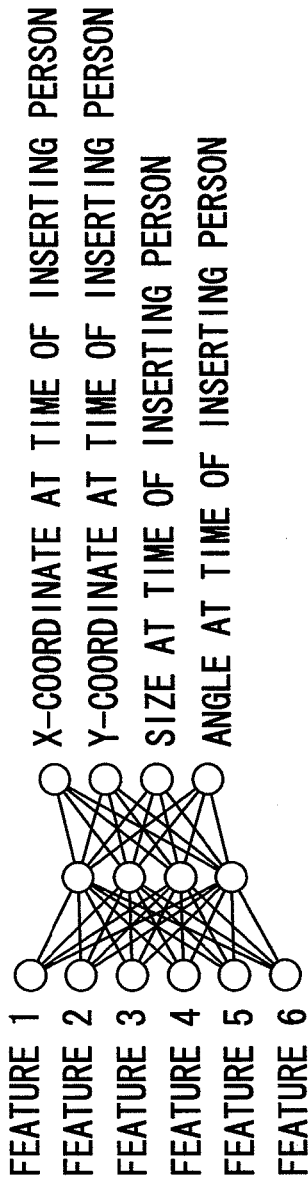

X-COORDINATE AT TIME OF INSERTING PERSON
Y-COORDINATE AT TIME OF INSERTING PERSON
SIZE AT TIME OF INSERTING PERSON
ANGLE AT TIME OF INSERTING PERSON

FEATURE 1
FEATURE 2
FEATURE 3
FEATURE 4
FEATURE 5
FEATURE 6

PICTURE OBTAINED BY FACING
CAMERA TOWARD GROUND

PICTURE OBTAINED BY
MACRO PHOTOGRAPHY

IMAGE PROCESSING APPARATUS, IMAGING APPARATUS, AND IMAGE PROCESSING METHOD

BACKGROUND OF THE INVENTION

1. Field of the Invention

The present invention relates to an image processing apparatus, an imaging apparatus, and an image processing method and, more particularly, to a technique for combining, into a background image, an image for insertion of a person or the like to fit the scene of the background image.

2. Description of the Related Art

There has been conventionally proposed a method for registering a background image and composite description data for a person corresponding thereto in advance, extracting a person image from an image taken by a camera, processing the person image (adjusting a position at which the person image is to be inserted and the size of the person image) according to the composite description data, and combining the person image into the background image (Japanese Patent Application Laid-Open No. 2000-209500; hereinafter referred to as Patent Document 1).

There is also proposed a person image processing method for detecting a face from an original image, measuring the orientation and size of the face, deforming a background image for synthesis according to the orientation and size of the face, on the basis of the measurement result, and then combining a person image including an image of the face and the background image (Japanese Patent Application Laid-Open No. 2004-297274; hereinafter referred to as Patent Document 2).

SUMMARY OF THE INVENTION

The methods disclosed in Patent Documents 1 and 2, however, suffer from the limited ability to combine a person image into only a background image for which a position at which a person image is to be inserted and a person image size are determined in advance.

The inventions disclosed in Patent Documents 1 and 2 are intended to combine a taken person image into a background image registered in advance and are not intended to combine an image for insertion such as a person image registered in advance into a taken image (an image which can serve as a background image).

The present invention has been made in consideration of the above-described circumstances, and has as its object to provide an image processing apparatus, an imaging apparatus, and an image processing method capable of combining an image for insertion such as a person image registered in advance into an arbitrary background image in a natural manner to fit a scene of the background image.

In order to solve the above-described object, according to a first aspect of the present invention, there is provided an image processing apparatus comprising a storage device which stores an image for insertion, an image acquisition device which acquires a background image forming a background of the image for insertion, an object recognition device which recognizes at least one object from the acquired background image and acquires object information including a position of the object, an image processing device which image-processes the image for insertion based on the object information to appropriately combine the image for insertion into the background image, and an image synthesis device which combines the processed image for insertion into the background image.

That is, the image processing apparatus is capable of recognizing at least one object from an arbitrary background image acquired by the image acquisition device and learning of what there are and where to find them in the background image at the time of combining an image for insertion stored in advance into the background image. The image for insertion is image-processed and is combined into the background image such that the image for insertion is combined in a natural manner in terms of image quality based on the object information including a position of the recognized object.

According to a second aspect of the present invention, in the image processing apparatus according to the first aspect, the storage device stores a photographed image of a person as the image for insertion.

With this configuration, it is possible to combine a person image into an image (background image), including a scenic picture, with no main subject such as a person.

According to a third aspect of the present invention, in the image processing apparatus according to the first or second aspect, wherein the object recognition device recognizes at least one object of objects with a ground attribute, including a road, soil, and sand, objects with a plant attribute, including a forest, a tree, and grass, objects with a water attribute, including the sea and a river, objects with an artificial construction attribute, including a building and a wall, and objects with a sky attribute, including a blue sky and a night sky.

According to a fourth aspect of the present invention, in the image processing apparatus according to any one of the first to third aspects, the image processing device subjects the image for insertion to image processing for at least one of a position at which the image for insertion is to be inserted into the background image, a size of the image for insertion, and an orientation of the image for insertion based on the object information.

According to a fifth aspect of the present invention, in the image processing apparatus according to the fourth aspect, the apparatus further comprises a specification device which specifies, by a user operation, at least one of whether to allow insertion of the image for insertion, an image to be selected as the image for insertion, the position at which the image for insertion is to be inserted, the size, and the orientation. This leaves room for a user to manually correct combination of an image for insertion and makes it possible to achieve insertion of an image for insertion desired by the user. Note that if a position at which an image for insertion is to be inserted, a size, an orientation, and the like automatically determined based on the object information and those specified by the specification device are present together, those specified by the specification device are given priority.

According to a sixth aspect of the present invention, in the image processing apparatus according to any one of the first to fifth aspects, the storage device stores a plurality of images for insertion, and the apparatus further comprises an evaluation device which assigns an importance value to each of the plurality of images for insertion using a past photography history, and an automatic selection device which automatically selects one to be actually inserted of the plurality of images for insertion based on the importance values assigned to the respective images for insertion by the evaluation device.

The image processing apparatus is configured to be capable of learning, from a past photography history, which one of a plurality of images for insertion stored in advance a user desires to insert and selecting the desired image for insertion.

According to a seventh aspect of the present invention, in the image processing apparatus according to the sixth aspect, the evaluation device assigns the importance value to each of the images for insertion based on at least one probability of a probability of an image including the image for insertion being taken, a probability of the image for insertion being at a center of an image, and a probability of the image for insertion facing toward a front of a viewer.

According to an eighth aspect of the present invention, in the image processing apparatus according to the sixth or seventh aspect, the apparatus further comprises a presentation device which presents an image for insertion selected by the automatic selection device to a user, and a specification device which specifies at least whether to insert the presented image for insertion. That is, the image processing apparatus makes it possible to present a result of automatically selecting an image for insertion to a user and confirm whether to allow insertion of the image for insertion. If the automatically selected image for insertion is not desired to be inserted, an image for insertion ranked second highest may be presented or an instruction for specifying an image for insertion may be accepted from a user.

According to a ninth aspect of the present invention, in the image processing apparatus according to any one of the first to eighth aspects, the apparatus further comprises a device which extracts a predetermined region from an input image and stores an image of the extracted region as the image for insertion in the storage device.

That is, the image processing apparatus is capable of generating an image for insertion from an inputted image and storing the image for insertion in the storage device.

According to a tenth aspect of the present invention, in the image processing apparatus according to the ninth aspect, the device which stores the image for insertion in the storage device determines, as the image for insertion, a candidate for the image for insertion based on at least one of a probability of an image including the candidate for the image for insertion being taken, a probability of the candidate for the image for insertion being at a center of an image, and a probability of the candidate for the image for insertion facing toward a front of a viewer and stores the determined image for insertion in the storage device.

That is, the image processing apparatus is capable of automatically determining, by reference to a photography history, an image for insertion which a user would desire to register and is capable of storing the image for insertion in the storage device.

According to an eleventh aspect of the present invention, in the image processing apparatus according to any one of the first to tenth aspects, the apparatus further comprises a deletion device which deletes an image for insertion stored in the storage device in accordance with a directive input from a user.

The deletion device allows a user to manually delete an image for insertion not desired to be registered in the storage device if the image for insertion is automatically registered.

According to a twelfth aspect of the present invention, in the image processing apparatus according to any one of the first to eleventh aspects, the apparatus further comprises a lighting situation determination device which determines a lighting situation of the background image, and the image processing device changes a lighting situation of the image for insertion based on a result of the determination.

The process of changing a lighting situation of an image for insertion as needed and causing lighting situations of a background image and the image for insertion to coincide with each other allows composition which is more natural in terms of image quality.

According to a thirteenth aspect of the present invention, in the image processing apparatus according to the twelfth aspect, the lighting situation determination device determines the lighting situation of the background image based on an object with the sky attribute recognized by the object recognition device.

That is, the lighting situation determination device determines a lighting situation based on an object with a sky attribute (e.g., a blue sky, cloudy sky, night sky, or sunset sky) which is believed to be strongly associated with how illumination is provided in an image for insertion.

According to a fourteenth aspect of the present invention, in the image processing apparatus according to the twelfth or thirteenth aspect, the change of the lighting situation of the image for insertion is a change in at least one of brightness, color, and shade of the image for insertion.

According to a fifteenth aspect of the present invention, in the image processing apparatus according to any one of the first to fourteenth aspects, the apparatus further comprises an estimation device which estimates whether an environment in the background image is an environment in which a shadow is likely to appear, and the image processing device performs one of selecting an image for insertion for which presence or absence of a shadow is hardly-noticeable as the image for insertion from the storage device and image-processing of the image for insertion such that presence or absence of a shadow is unnoticeable if it is estimated that the environment in the background image is an environment in which a shadow is likely to appear.

For example, assume that it is estimated that an environment in a background image is an environment in which a shadow is likely to appear. When an upper-body image and a whole-body image of a person are stored as candidates for an image for insertion, the upper-body image is selected. When only a whole-body image is stored, the whole-body image is converted into an upper-body image by removing an image of a lower body part (in particular, a foot part). This prevents an image from appearing unnatural even if the image is obtained by inserting the image for insertion with no shadow.

According to a sixteenth aspect of the present invention, in the image processing apparatus according to the fifteenth aspect, the estimation device estimates whether the environment in the background image is an environment in which a shadow is likely to appear, based on at least one object of an object with the ground attribute and an object with the sky attribute recognized by the object recognition device.

An example of a case where the environment is an environment in which a shadow does not appear is a case where a cloudy sky is recognized as an object with a sky attribute, and the ground recognized as an object with a ground attribute is dark.

According to a seventeenth aspect of the present invention, in the image processing apparatus according to any one of the first to sixteenth aspects, the apparatus further comprises a resolution determination device which determines resolutions of the background image and image for insertion, and the image processing device performs image processing for causing the resolutions of the background image and image for insertion to coincide with each other.

The process of causing resolutions of a background image and image for insertion to be coincide allows more natural combination of the image for insertion.

According to an eighteenth aspect of the present invention, in the image processing apparatus according to the seventeenth aspect, the resolution determination device comprises a device which calculates an enlargement ratio for the image for insertion, and the image processing device performs one of reducing an image size of the background image and changing a frequency characteristic of the background image if the calculated enlargement ratio for the image for insertion exceeds a predetermined value.

That is, if it is necessary to increase an enlargement ratio for an image for insertion and perform combination, a resolution of the image for insertion decreases. Accordingly, if a value of the enlargement ratio for the image for insertion exceeds a predetermined value, a process of keeping the enlargement ratio for the image for insertion unchanged or reducing the enlargement ratio to a low value and reducing an image size of a background image for compensation or a process of blurring the background image using a low-pass filter is performed to cause resolutions of both the images to coincide with each other.

According to a nineteenth aspect of the present invention, in the image processing apparatus according to the seventeenth or eighteenth aspect, the resolution determination device comprises a device which calculates an enlargement ratio for the image for insertion, and the apparatus further comprises a switching device which switches whether to combine the image for insertion into the background image based on the calculated enlargement ratio for the image for insertion.

That is, if the calculated enlargement ratio for an image for insertion is extremely large (e.g., 10), insertion into a background image itself is abandoned.

According to a twentieth aspect of the present invention, there is provided an imaging apparatus comprising an imaging device, and an image processing apparatus according to any one of the first to nineteenth aspects, wherein the image processing apparatus acquires an image picked up by the imaging device as the background image.

According to a twenty-first aspect of the present invention, there is provided an imaging apparatus comprising an imaging device, a face detection device which detects a human face from an image picked up by the imaging device, and an image processing apparatus according to any one of the first to nineteenth aspects, wherein the image acquisition device acquires, as the background image, an image in which a human face is not detected by the face detection device, and the image processing apparatus operates only if a human face is not detected by the face detection device.

That is, only an image without a person such as a scenic picture is treated as a background image, and a person image with a person is not treated as a background image.

According to a twenty-second aspect of the present invention, there is provided an imaging apparatus comprising an imaging device, a mode selection device which selects an image insertion photography mode of inserting the image for insertion into an image picked up by the imaging device, and an image processing apparatus according to any one of the first to nineteenth aspects, wherein the image acquisition device acquires, as the background image, an image picked up by the imaging device if the image insertion photography mode is selected, and the image processing apparatus operates only if the image insertion photography mode is selected.

Only when the image insertion photography mode is selected at a user's desire, an image for insertion is inserted into an image (background image) taken in the mode.

According to a twenty-third aspect of the present invention, in the imaging apparatus according to any one of the twentieth to twenty-second aspect, the apparatus further comprises a mode selection device which selects an image registration photography mode of registering the image for insertion, and when the image registration photography mode is selected, the image picked up by the imaging device is stored as the image for insertion in the storage device.

Photography after selecting the image registration photography mode makes it possible to take an image for insertion desired to be inserted into the background image at a user's desire and register the image for insertion in the storage device.

According to a twenty-fourth aspect of the present invention, in the imaging apparatus according to any one of the twentieth to twenty-third aspect, the apparatus further comprises a synthesis determination device which determines whether to combine the image for insertion into the image picked up by the imaging device, and the image processing apparatus is operated only when it is determined that the image for insertion is to be combined.

If an image picked up by the imaging device is unsuitable as a background image into which an image for insertion is to be inserted, an image for insertion is not inserted.

According to a twenty-fifth aspect of the present invention, in the imaging apparatus according to the twenty-fourth aspect, the synthesis determination device determines whether to combine the image for insertion based on at least one of an object distance of the image picked up by the imaging device, an angle which a photographing optical axis at the time of photography of the image picked up by the imaging device forms with a vertical direction, and a photography mode selected at the time of photography.

For example, if it is determined from an object distance that an image is an image obtained by macro photography or it is determined from an angle which a photographing optical axis at the time of photography forms with the vertical direction that the image is obtained by ground photography, the image is unsuitable as a background image. An image taken in a macro photography mode or portrait mode as an example of the photography mode is also unsuitable as a background image.

According to a twenty-sixth aspect of the present invention, there is provided an image processing method comprising the steps of: a step of preparing an image for insertion, a step of acquiring a background image forming a background of the image for insertion, a step of recognizing at least one object from the acquired background image and acquiring object information including a position of the object, a step of performing image processing on the image for insertion to appropriately combine the image for insertion into the background image, and a step of combining the processed image for insertion into the background image.

According to a twenty-seventh aspect of the present invention, in the imaging processing method according to the twenty-sixth aspect, the image for insertion is a photographed image of a person.

According to a twenty-eighth aspect of the present invention, in the imaging processing method according to the twenty-sixth or twenty-seventh aspect, the object recognition comprises recognizing at least one object of objects with a ground attribute, including a road, soil, and sand, objects with a plant attribute, including a forest, a tree, and grass, objects with a water attribute, including the sea and a river, objects with an artificial construction attribute, including a building and a wall, and objects with a sky attribute, including a blue sky and a night sky.

According to a twenty-ninth aspect of the present invention, in the imaging processing method according to any one of the twenty-sixth to twenty-eighth aspects, the step of performing the image processing comprises subjecting the image for insertion to image processing for at least one of a position at which the image for insertion is to be inserted into the background image, a size of the image for insertion, and an orientation of the image for insertion based on the object information.

According to the present invention, when an image for insertion such as a person image registered in advance is to be combined into an arbitrary background image, one or more objects are recognized from the background image, and the image for insertion is optimized and combined with knowledge of what there are and where to find them in the background image. It is thus possible to combine an image for insertion into a background image in a natural manner to fit the scene of the background image.

BRIEF DESCRIPTION OF THE DRAWINGS

FIG. 2 is a flow chart showing the flow of overall processing of a first embodiment according to the present invention;

FIG. 4 is a chart showing an example of a method for determining at which position, in which size, and in which orientation a person image is to be inserted when a background image has each of compositions;

DETAILED DESCRIPTION OF THE PREFERRED EMBODIMENTS

Preferred embodiments of an image processing apparatus, an imaging apparatus, and an image processing method according to the present invention will be described below with reference to the accompanying drawings.

[Configuration of Imaging Apparatus]

Figure 1:
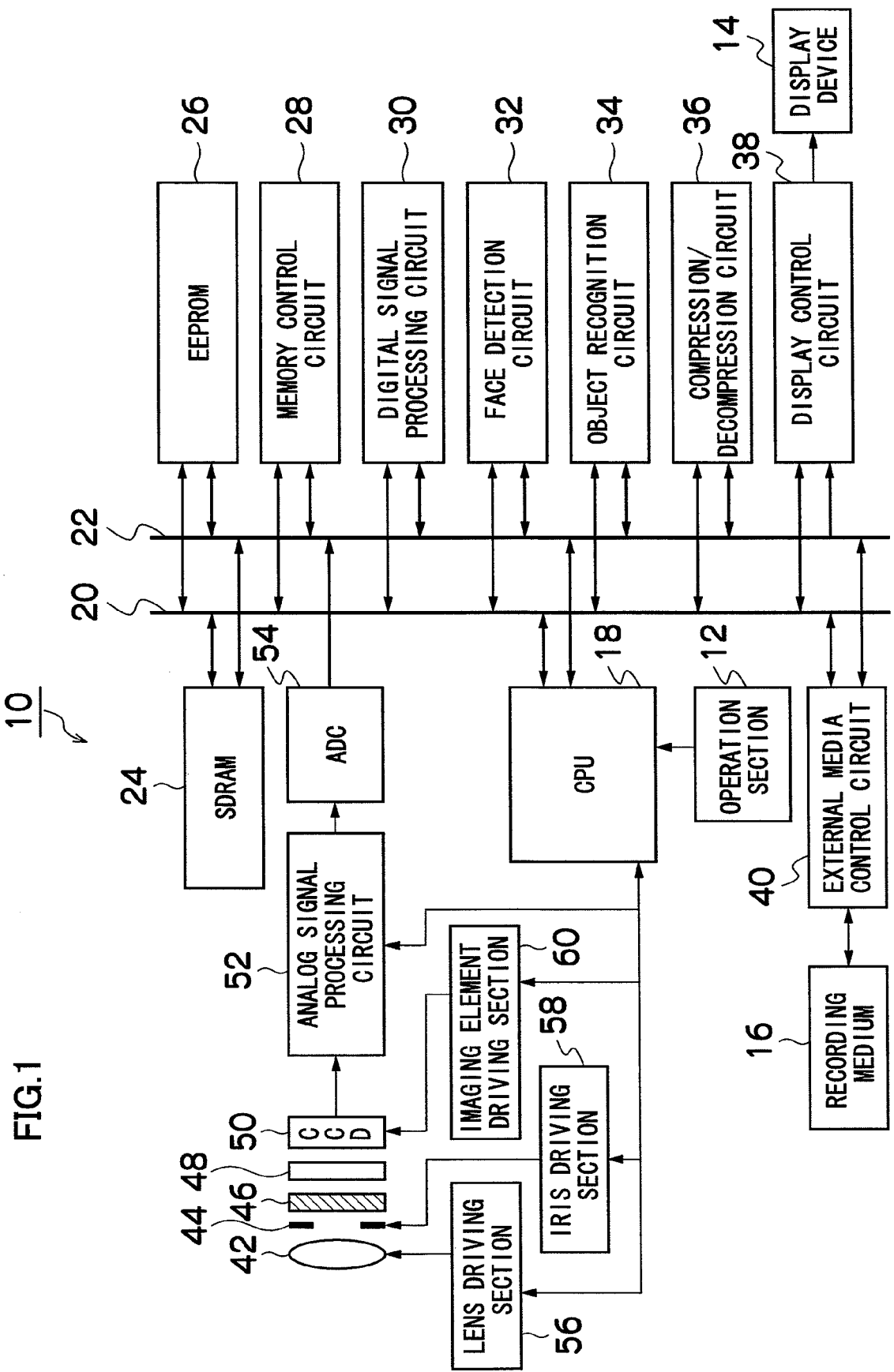
FIG. 1 is a block diagram showing am embodiment of an imaging apparatus (digital camera) according to the present invention.

FIG. 1 is a block diagram showing an embodiment of an imaging apparatus (digital camera) 10 according to the present invention.

The digital camera 10 has the function of recording and playing still images and moving images. An operation section 12 includes a power button, a shutter button, a mode lever, a zoom key, a play button, a multifunction cross key composed of up, down, left, and right keys, a menu/OK button, and a display/back button.

The mode lever can be set to any one of an auto photography mode, a manual photography mode, a scene position mode which allows selection among a portrait mode, a landscape mode, a night scene mode, and the like, and a moving image photography mode by being rotated. The shutter button has a switch S1 which is turned on at the time of half press to make arrangements for photography such as autoexposure adjustment (AE) or autofocus adjustment (AF) and a switch S2 which is turned on at the time of full press to capture an image.

A display device (liquid crystal monitor) 14 can be used as an electronic viewfinder which displays a moving image (through image) and can display a taken image before recording (preview image), an image read out from a recording medium 16 such as a memory card loaded in the camera, and the like. The display device 14 displays one of various menu screens for manually setting the operation mode and white balance of the camera, the number of image pixels, sensitivity, and the like in accordance with an operation of the menu/OK button and displays a graphical user interface (GUI) screen which allows setting of manual setup items according to an operation of the cross key and menu/OK button.

A central processing unit (CPU) 18 to which an operation signal is inputted from the operation section 12 controls circuits in the digital camera 10 and performs processing according to a camera control program. The CPU 18 is connected to a control bus 20 and a data bus 22.

To the control bus 20 and data bus 22 are connected an SDRAM (synchronous dynamic RAM) 24, an EEPROM 26, a memory control circuit 28, a digital signal processing circuit 30, a face detection circuit 32, an object recognition circuit 34, a compression/decompression circuit 36, a display control circuit 38, and an external media control circuit 40, in addition to the CPU 18. An A/D conversion circuit 54 is connected to the data bus 22.

The CPU 18 transfers necessary data between the SDRAM 24 and the EEPROM 26. The memory control circuit 28 controls reading/writing of data from/to the SDRAM 24 and EEPROM 26 in accordance with a command from the CPU 18.

A camera control program, various parameters related to camera control such as defect information of a solid-state imaging element, and an image for insertion such as a person image according to the present invention are stored in the EEPROM 26. The CPU 18 expands the camera control program stored in the EEPROM 26 to the SDRAM 24 and performs various processes using the SDRAM 24 as a work memory.

When the power button of the operation section 12 is operated to be on in the digital camera 10, the CPU 18 detects this, turns on the power within the camera, and places the camera into a photography standby state in a photography mode. In the photography standby mode, the CPU 18 generally causes the display device 14 to display a moving image (through image).

A user (photographer) performs framing, checks a subject desired to be photographed, checks a taken image, or sets photography conditions while viewing a through image displayed on the display device 14.

When the shutter button is pressed halfway during the photography standby state, the CPU 18 detects this and performs AE photometry and AF control. At the time of AE photometry, the CPU 18 measures the brightness of a subject on the basis of integration values of image signals obtained through a solid-state imaging element (CCD) 50. A resultant photometric value is used to determine the aperture value of an iris 44 and a shutter speed at the time of regular photography. Note that, at the time of regular photography, the CPU 18 drives the iris 44 through an iris driving section 58 on the basis of the aperture value determined based on the photometric value and controls a charge storage time in the CCD 50 (a so-called electronic shutter) through an imaging element driving section 60 such that the camera has the shutter speed determined based on the photometric value.

At the time of AF control, the CPU 18 performs contrast AF, the process of sequentially moving a focus lens from a lens position corresponding to close proximity to a lens position corresponding to infinity, acquiring, on the basis of image signals in an AF area obtained at each lens position through the CCD 50, an evaluation value obtained by integrating high-frequency components of the image signals, obtaining a lens position where the evaluation value is at its maximum, and moving the focus lens to the lens position.

A subject light beam strikes a light-receiving surface of the CCD 50 through a taking lens 42 including the focus lens and a zoom lens, the iris 44, an infrared cut filter 46, and an optical low-pass filter 48.

The CCD 50 is composed of a color CCD having R, G, and B color filters arranged in a predetermined color filter pattern (e.g., a honeycomb pattern or Bayer pattern). A light beam incident on the light-receiving surface of the CCD 50 is converted, by photodiodes arranged at the light-receiving surface, into signal charges, the amount of which corresponds to the amount of the incident light. The signal charge stored in each photodiode is read out in response to a timing signal supplied from the imaging element driving section 60, and the signal charges are sequentially outputted as voltage signals (image signals) from the CCD 50.

An analog signal processing circuit 52 includes a CDS circuit and an analog amplifier. The CDS circuit subjects a signal outputted from the CCD to correlated double sampling in accordance with a CDS pulse, and the analog amplifier amplifies an image signal outputted from the CDS circuit by means of a gain for photography sensitivity setting for the CPU 18. An A/D conversion circuit 54 converts analog image signals outputted from the analog signal processing circuit 52 into digital image signals. The image signals after the conversion (R, G, and B raw data) are transferred to the SDRAM 24 through the data bus 22 and are temporarily stored therein.

The face detection circuit 32 detects a human face from a through image and outputs information on the position and size of the face to the CPU 18. More specifically, the face detection circuit 32 includes an image matching circuit and a face image template. The image matching circuit matches an image in a target region with the face image template while moving the target region within a screen for the through image and checks the correlation between them. If a correlation score exceeds a predetermined threshold value, the face detection circuit 32 recognizes the target region as a face region. The face detection circuit 32 can similarly detect a face from a taken image.

Note that known methods such as a face detection method using edge detection or shape pattern detection and a face detection method using hue detection or skin color detection are available as face detection methods, in addition to the above-described method.

The CPU 18 is configured to be capable of, upon acquisition of information indicating the position and size of a human face region from the face detection circuit 32, combining a face detection frame surrounding the acquired face region into a through image and displaying the resultant image on the display device 14. The position and size of a face region thus detected are used to define an AF area for causing a human face to be in focus or an AE area for making the brightness of a human face appropriate.

The object recognition circuit 34 recognizes one or more objects from a taken image, acquires object information including the positions, regions, and types of the objects, and outputs the object information. Such object information is information indicating what there are and where to find them in a taken image (background image) and is used to appropriately combine an image for insertion into the background image. Note that the details of the object recognition circuit 34 will be described later.

The digital signal processing circuit 30 functions as an image processing device including a white balance adjustment circuit, a gamma correction circuit, a synchronization circuit, a luminance/color difference signal generation circuit, an edge correction circuit, an image conversion circuit for an image for insertion, and a synthesis processing circuit and performs predetermined signal processing using the SDRAM 24 in accordance with a command from the CPU 18. More specifically, the white balance adjustment circuit applies respective digital gains to R,. G, and B image signals read out from the SDRAM 24, thereby subjecting the R, G, and B image signals to white balance adjustment. The gamma correction circuit performs gray-level transformation according to a gamma characteristic. The synchronization circuit performs synchronization processing, the process of interpolating spatial shifts in the color signals caused by the color filter arrangement of the single-CCD and converting the color signals into synchronized signals. The synchronized R, G, and B image signals are further converted into a luminance signal Y (Y signal) and color difference signals Cr and Cb (YC signals) by the luminance/color difference signal generation circuit. The Y signal is subjected to edge enhancement processing by the edge correction circuit while the YC signals processed by the digital signal processing circuit 30 are stored back in the SDRAM 24.

The image conversion circuit of the digital signal processing circuit 30 is intended to perform various conversion processes on an image for insertion when inserting the image for insertion into a background image at an appropriate position. The image conversion circuit performs conversion processing (including coordinate conversion) for the image for insertion on the basis of settings for the image for insertion (information on a position at which an image is to be inserted, a size, an orientation, a color, brightness, and the like) corresponding to object information supplied from the CPU 18. The synthesis processing circuit combines the processed image for insertion into the background image. Note that a specific example of the details of processing by the image conversion circuit of the digital signal processing circuit 30 will be described later.

YC signals processed by the digital signal processing circuit 30 and stored in the SDRAM 24 are compressed by the compression/decompression circuit 36 and are recorded on the recording medium 16 as an image file in a predetermined format (e.g., JPEG (Joint Photographic Experts Group) format) through the external media control circuit 40. Any of various recording media such as a semiconductor memory card which is detachable from the digital camera 10 and is typified by xD Picture Card (registered trademark) and SmartMedia (registered trademark), a portable small hard disk, a magnetic disk, an optical disk, and a magneto-optical disk can be used as the recording medium 16.

When the play button of the operation section 12 is operated, and a play mode is selected, an image file of the last frame recorded on the recording medium 16 is read out through the external media control circuit 40. Compressed data of the read-out image file is decompressed into uncompressed YC signals through the compression/decompression circuit 36.

The decompressed YC signals are held in the SDRAM 24 (or a VRAM (not shown)), are converted into signals for display by the display control circuit 38, and are outputted to the display device 14. This causes an image of the last frame recorded on the recording medium 16 to be displayed on the display device 14.

When a frame advance switch (the right key of the cross key) is pressed after that, a frame position is switched to the next frame in the forward direction. On the other hand, when a frame reverse switch (the left key of the cross key) is pressed, the frame position is switched to the next frame in the reverse direction. An image file at the frame position is read out from the recording medium 16, and an image of the frame is played on the display device 14 in the above-described manner.

First Embodiment

A first embodiment where a person image (image for insertion) registered in advance is combined into a taken image (background image) will be described.

As for digital cameras, there are many known object recognition techniques for understanding what there are and where to find them in a taken image (e.g., P. Duygulu et al., "Object Recognition as Machine Translation: Learning a Lexicon for a Fixed Image Vocabulary").

The present invention relates to insertion of a person into a picture or the like with no person in a natural manner in terms of image quality using such object recognition. In particular, the present invention is capable of adaptively setting an appropriate position, size, and orientation at the time of person insertion by applying object recognition to any picture.

FIG. 2 is a flow chart showing the flow of overall processing of the first embodiment according to the present invention.

First, image data serving as a background image is captured and is temporarily stored in an SDRAM 24 (step S10).

An object recognition circuit 34 performs, on the image data (background image) temporarily stored in the SDRAM 24, object recognition processing for learning of what there are and where to find them in the background image using a database for object recognition (step S12).

Assume here that the database contains descriptions such as "The sky is composed of continuous pixels whose hues are in the range of ±α, whose luminance levels are in the range of ±β, and which are located at the upper end of an image.", "A road is . . . ", and "A building is . . . ".

The object recognition circuit 34 recognizes any one or more of objects with a ground attribute such as a road, soil, and sand, objects with a plant attribute such as a forest, a tree, and grass, objects with a water attribute such as the sea and a river, objects with an artificial construction attribute such as a building and a wall, and objects with a sky attribute such as a blue sky and a night sky. The object recognition circuit 34 preferably recognizes as many objects as possible (all objects in the image).

The object recognition circuit 34 acquires object information including the positions, sizes (regions), types, and the like of the one or more objects recognized in the above-described manner and outputs the object information to a CPU 18.

The CPU 18 sets a position at which an image for insertion (person image) is to be inserted, a size, and an orientation on the basis of the inputted object information (recognition result) (step S14).

FIGS. 3A to 3D show examples of setting the position at which an image for insertion is to be inserted, the size, and the orientation.

Figure 3A:
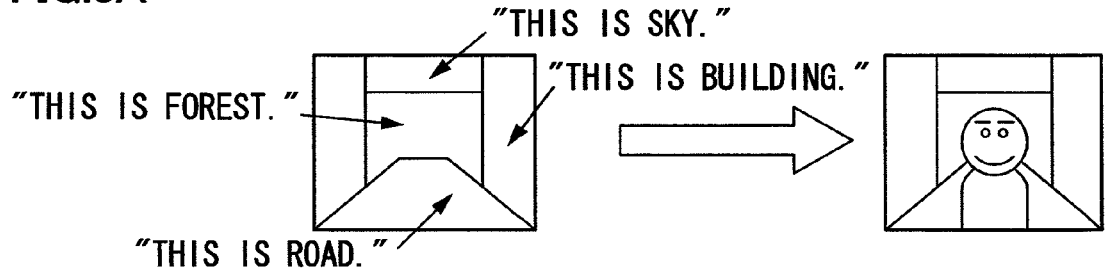
FIGS. 3A to 3D are views showing examples of setting a position at which an image for insertion is to be inserted, a size, and an orientation.

If the background image has a nearly bilaterally-symmetric composition, and there is no potential main subject such as a building at the center, as shown in FIG. 3A, a person image is inserted in a larger size at the center.

Figure 3B:
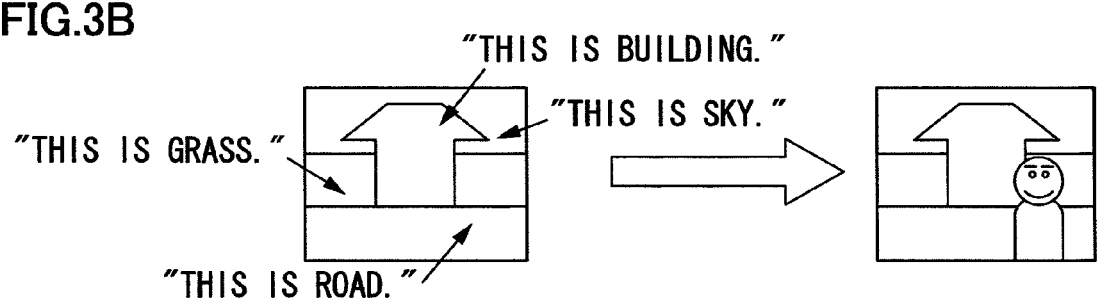

If there is a potential main subject such as a building at the center of the background image, as shown in FIG. 3B, the person image is inserted at a position out of the way of the potential main object and not too close to an edge.

Figure 3C:
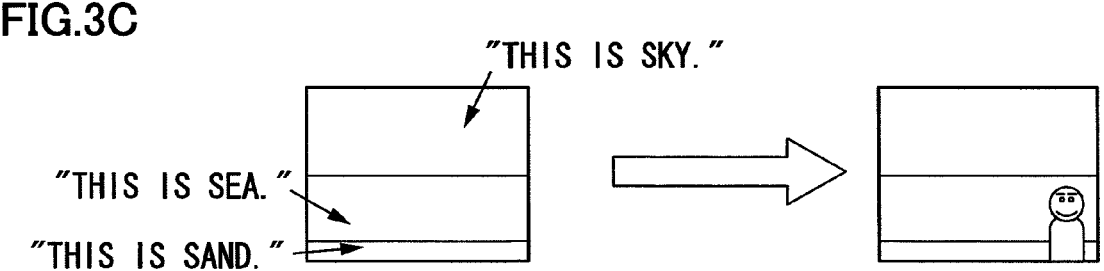

If there is an object which occupies a large part of the lower half of the background image, as shown in FIG. 3C, the person image is inserted in a smaller size near an edge to keep a spacious appearance.

Figure 3D:
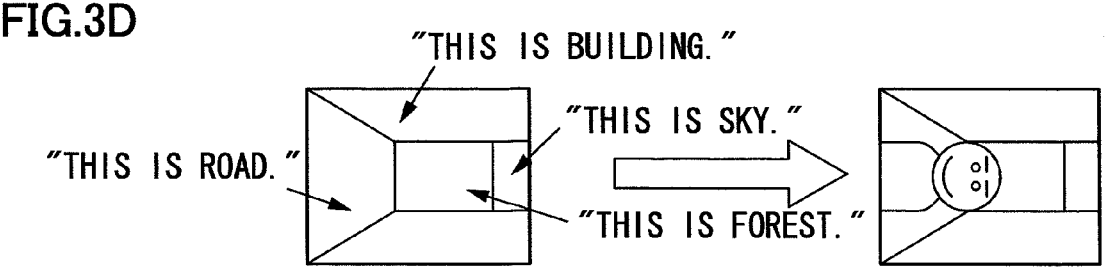

If the background image is recognized as being picked up in a portrait format from the positional relationship among the ground, a building, and the sky, as shown in FIG. 3D, a person image is inserted with an orientation tailored to the format (while being rotated). Note that, if the background image is recognized as being inclined from the horizon or the like, the person image is rotated to suit the inclination such that the person image is oriented in the vertical direction in the background image and is inserted.

Examples of a method for determining at which position, in which size, and in which orientation a person image is to be inserted when a background image has each of compositions include a method as shown in FIG. 4. More specifically, several types of features are extracted from object recognition results for many pictures, and a neural network is made to learn the relationship between the values of the types of features and an x-coordinate, a y-coordinate, a size, and an orientation (angle) at the time of inserting a person image. The object recognition results for the many pictures and "a position, a size, and an orientation preferable in terms of image quality at the time of insertion" determined by an examinee's subjectivity for each of the pictures may be used as training data.

Referring back to FIG. 2, when the position at which the image for insertion is to be inserted, the size, and the orientation are set in step S14, an image conversion circuit of a digital signal processing circuit 30 performs positioning of the image for insertion, coordinate conversion for rotation and scaling on the image for insertion on the basis of the settings, and a synthesis processing circuit combines the processed image for insertion into the background image (step S16).

Note that although one stored in advance in an EEPROM 26 is used as the image for insertion to be inserted, a user may determine, by, e.g., advancing or reversing one frame at a time using a cross key, which image for insertion (person image) to use and which one of images of the same person to select and in which state (pose and photography environment) the one to be selected is captured. Of course, a plurality of person images may be inserted or an image for insertion with a set of people may be registered in advance.

In addition to selection of an image for insertion, specification of at least one of whether to allow insertion of an image for insertion, a position at which an image for insertion is to be inserted, a size, and an orientation may be allowed by a user operation using an operation section 12. This leaves room for a user to manually correct combination of an image for insertion and makes it possible to achieve insertion of an image for insertion desired by the user.

It is further desirable to provide a mode of registering an image for insertion in the EEPROM 26 by pre-photography. Insertion of an image for insertion into a background image may be performed immediately before recording the image for insertion on a recording medium 16, after each photography by a digital camera 10. Alternatively, a desired image may be read out and played and displayed after photography, and an image for insertion may be inserted into the played image.

Moreover, an "image insertion photography mode" may be provided. Only when the "image insertion photography mode" is selected by a mode lever of the operation section 12 or is selected on a menu screen by operating the cross key and menu/OK button, and photography is performed in the "image insertion photography mode," an image for insertion may be inserted into an image obtained from the photography as a background image.

Only when an image with no face detected is taken by a face detection circuit 32, the process of inserting an image for insertion into the image as a background image may be performed.

Second Embodiment

According to the first embodiment of the present invention, it is possible to insert a person image into any picture in a more natural manner. However, some pictures are far from suitable for insertion of a person image.

Figure 5A:
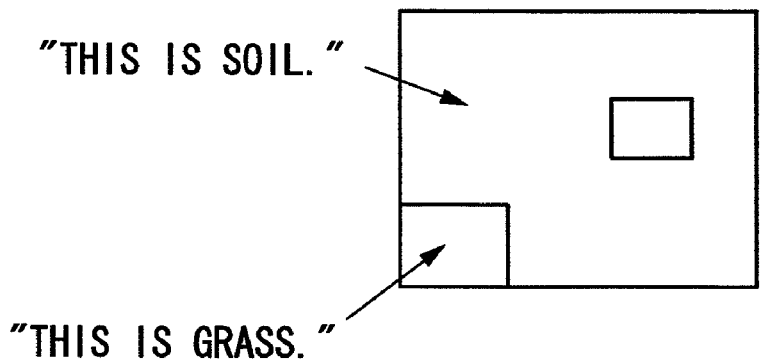
FIGS. 5A and 5B are views showing examples of a picture far from suitable for insertion of a person image.

For example, in the case of a picture taken with a camera facing toward the ground immediately therebelow, as shown in FIG. 5A, if a person image is inserted into the picture, the picture appears unnatural (it is uncommon to photograph a person with a camera facing immediately therebelow).

Figure 5B:
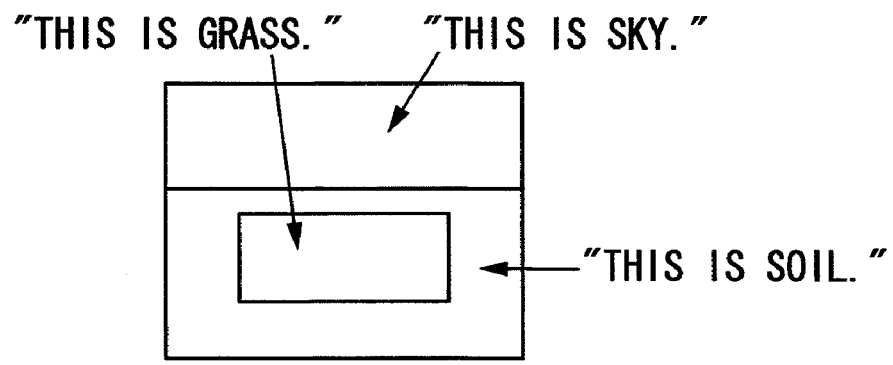

Even in the case of a picture with grass, as shown in FIG. 5B, if the picture is obtained by macroscopically photographing grass at a short distance, the picture appears unnatural when a person image is inserted into the picture.

In the case of FIG. 5A, although use of object recognition allows the recognition that the ground covers the whole screen, computation time and power consumption required for recognition increase accordingly. On the other hand, in the case of FIG. 5B, it is difficult to determine only by object recognition whether grass is macroscopically photographed or distant grass is photographed.

For this reason, whether a picture is suitable for insertion of a person image is automatically determined by simple pre-processing before object recognition, and a person image is inserted into the picture if the picture is suitable.

Figure 6:
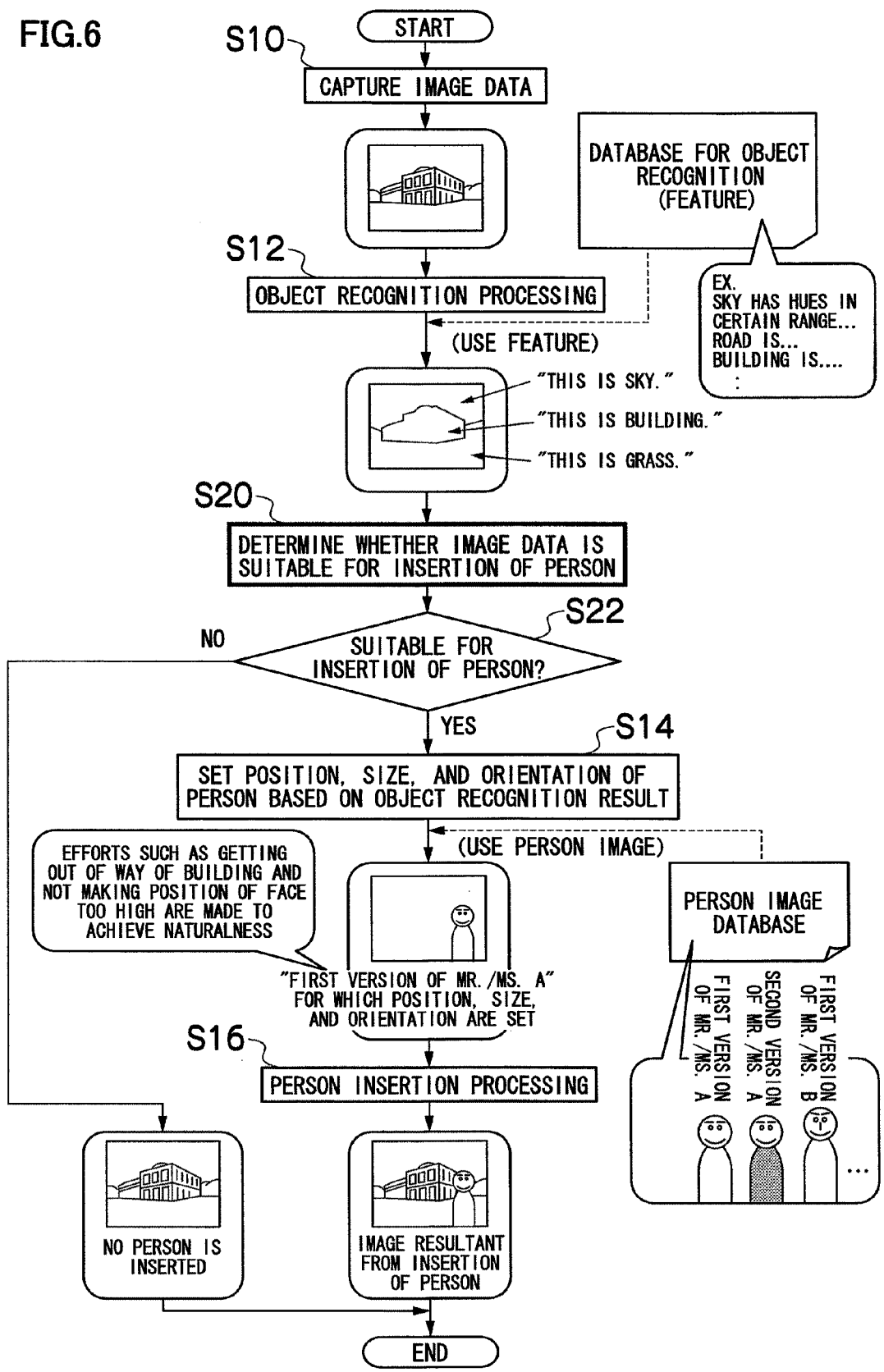
FIG. 6 is a flow chart showing the flow of overall processing of a second embodiment according to the present invention.

FIG. 6 is a flow chart showing the flow of overall processing of a second embodiment of the present invention. Note that, in FIG. 6, steps of performing the same processes as those in the first embodiment shown in FIG. 2 are denoted by the same step numbers, and a detailed description thereof will be omitted.

The second embodiment shown in FIG. 6 is different from the first embodiment in that processes in steps S20 and S22 are added.

In step S20, it is determined whether an image captured in step S10 is suitable for insertion of a person image. In step S22, if it is determined that the image is suitable for insertion of a person image, the flow shifts to step S14 to perform insertion of a person image. On the other hand, if it is determined that the image is unsuitable for insertion of a person image, insertion of a person image is abandoned, and the process ends.

Figure 7:
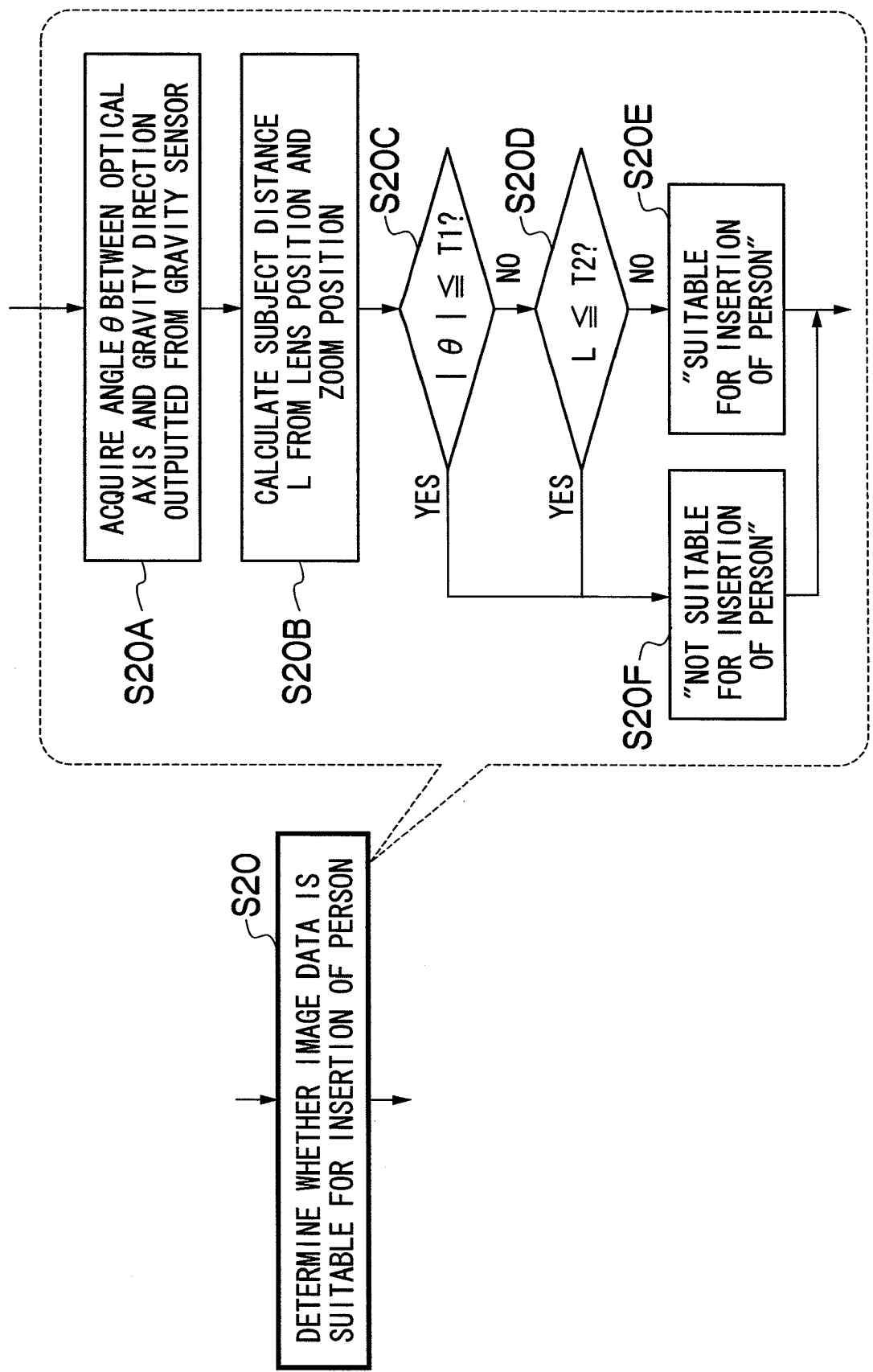
FIG. 7 is a flow chart showing the details of step S20 in FIG. 6.

FIG. 7 is a flow chart showing the details of step S20 in FIG. 6.

As shown in FIG. 7, a gravity sensor or the like is provided in a digital camera 10 to measure an angle θ which a photographing optical axis at the time of photography forms with the vertical direction (step S20A). A subject distance L is calculated from a focus lens position where an in-focus state is achieved and a zoom position (step S20B).

It is determined whether the absolute value of the measured angle θ is not more than a predetermined threshold value Ti for determination of ground photography. If $|θ|≦T1$, the flow shifts to step S20F. On the other hand, if $|θ|>T1$, the flow shifts to step S20D.

In step S20D, it is determined whether the calculated subject distance L is not more than a predetermined threshold value T2 for determination of macro photography. If $L≦T2$, the flow shifts to step S20F. On the other hand, if $L>T2$, the flow shifts to step S20E.

For this reason, if the image is one obtained by ground photography ($|θ|≦T1$) or if the image is one obtained by macro photography ($L≦T2$), it is determined that the image is one unsuitable for insertion of a person image (step S20F). Otherwise, it is determined that the image is one suitable for insertion of a person image (step S20E).

Note that although a macro photography mode can be set using a cross key of an operation section 12, an image taken after the macro photography mode is selected at the time of photography can be determined as one unsuitable for insertion of a person image. Although a portrait mode can be selected using a mode lever of the operation section 12, an image taken after the portrait mode is selected at the time of photography can also be determined as one unsuitable for insertion of a person image.

As described above, by determining in advance whether an image is unsuitable for insertion of a person image, it is possible to omit object recognition and reduce computation time and power consumption. It is also possible to correctly determine whether an image hard to determine only by object recognition is suitable/unsuitable for insertion of a person image and prevent unnatural insertion of a person image.

Third Embodiment

[Selection of Image for Insertion (Person Image)]

A user needs to manually select whose image to use as an image for insertion (person image) to be inserted into a background image among many registered person images, which is troublesome.

For this reason, a third embodiment according to the present invention is configured to be capable of estimating a person whom a user would desire to insert from a past photography history of pictures with people and preferentially inserting the person and saving the user's trouble.

Figure 8:
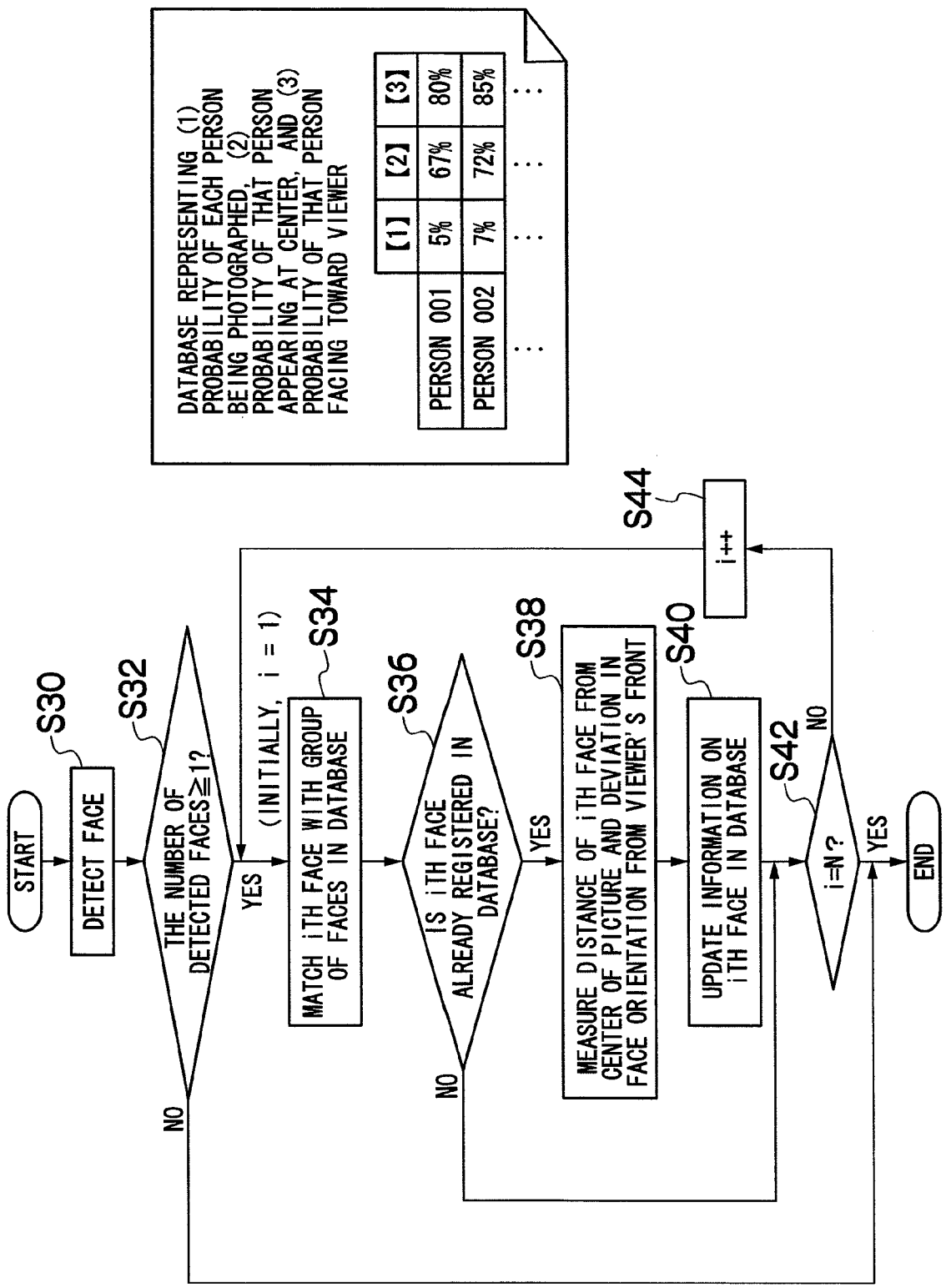
FIG. 8 is a flow chart showing the flow of the process of automatically selecting a person image.

FIG. 8 is a flow chart showing the flow of the process of automatically selecting a person image.

Components of the importance (for a user) of each person include the following three:

(1) the probability of the person being photographed;
(2) the probability of the person appearing at the center; and
(3) the probability of the person facing toward the viewer's front.

In FIG. 8, face detection is performed by a face detection circuit 32 each time a picture is taken (step S30). If it is determined that the number N of detected faces is not less than 1 (step S32), the ith (initially, i=1) one of the N detected faces is matched with a group of faces registered as images for insertion in a database (step S34).

It is then determined whether the ith face is already registered in the database. If the ith face is already registered, the flow shifts to step S38; otherwise, the flow shifts to step S42 (step S36).

The distance of the ith face from the center of the picture and the deviation in face orientation from the viewer's front are measured (step S38), and the above-described probabilities (1) to (3) in the database are updated (step S40).

It is determined whether i=N (step S42). If i≠N, i is incremented, and the flow returns to step S34 (step S44). On the other hand, if i=N, processing for the image ends.

In the above-described manner, the database is updated each time a picture is taken, and an importance value is assigned to each person using the past photography history in the database.

Examples of an indicator which is a combination of the above-described probabilities (1) to (3) include a weighted Euclidean distance given by the following formula:

$$Uj=\sqrt{(p \cdot Aj^2 + q \cdot Bj^2 + r \cdot Cj^2)}$$ [Formula 1]

where Aj, Bj, and Cj are the above-described probabilities (1) to (3) of the jth person in the database.

As a method for selecting a person image to be inserted, a method for selecting a person image whose Uj has the highest value and unconditionally inserting the person image may be used. However, since it is quite conceivable that another person image is desired to be inserted, the message "Do you want to insert the person image?" may be presented on a display device 14 together with the person image. In this case, when a menu/OK button is pressed at an operation section 12, the person image is confirmed as the image for insertion. On the other hand, when a display/back button is pressed, a person image whose Uj has the second highest value, and the message are presented to prompt for a user determination in the above-described manner.

Fourth Embodiment

[Registration of Image for Insertion (Person Image)]

Preparation of a database of images for insertion (person images) to be inserted into a background image is time-consuming.

Examples of this include the process of providing an "image registration photography mode," selecting the "image registration photography mode" using an operation section 12, and registering a taken image as an image for insertion in a database if photography is performed in the "image registration photography mode."

If the number of persons registered using the "image registration photography mode" is large, the operation of photographing a person and adding a taken image to a database needs to be repeated many times, which is troublesome for users.

For this reason, a fourth embodiment according to the present invention is configured to be capable of automatically extracting and registering a person image which a user desires to insert using a photography history and saving the user's trouble.

Figure 9:
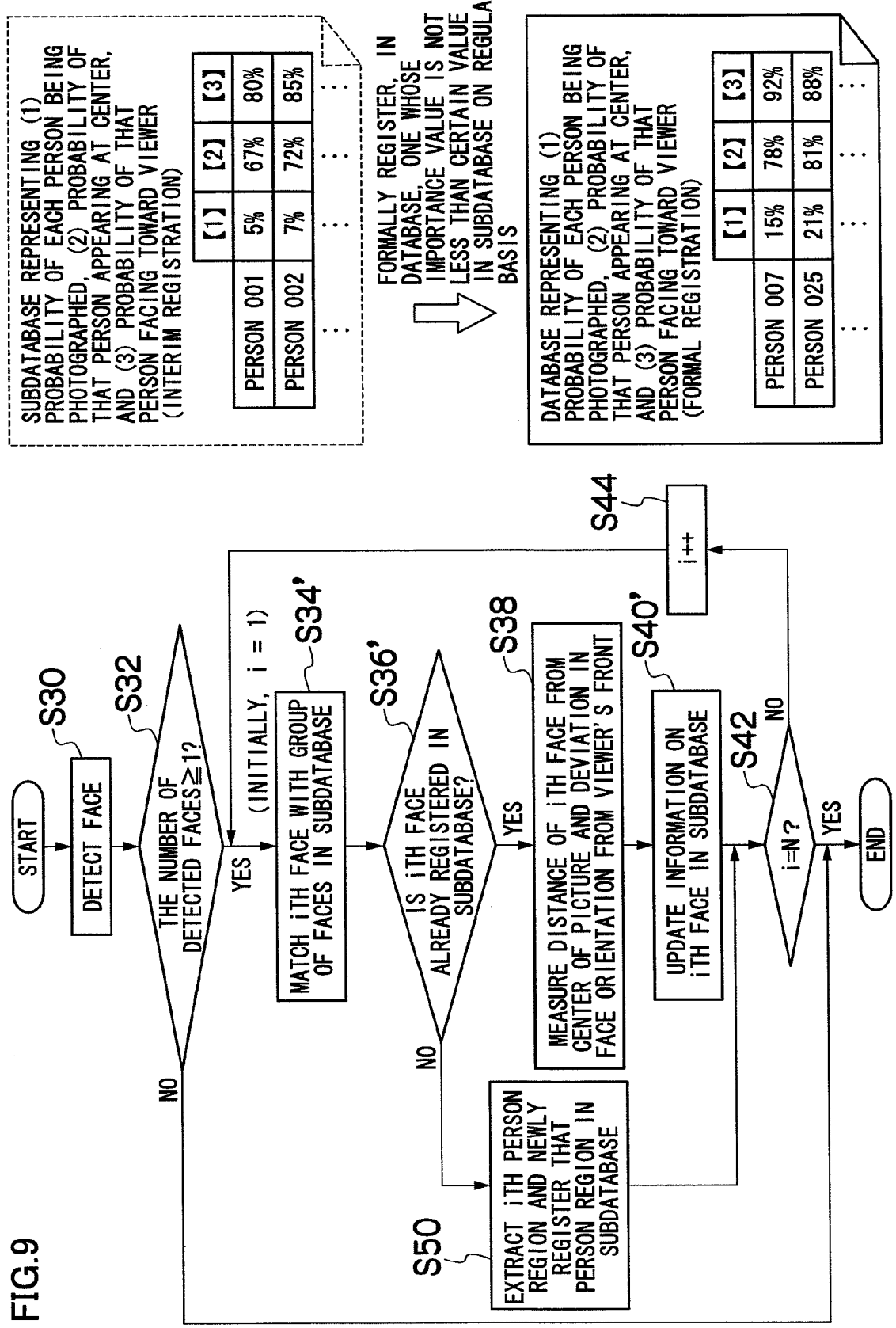
FIG. 9 is a flow chart showing the flow of the process of automatically registering a person image.

FIG. 9 is a flow chart showing the flow of the process of automatically registering a person image. Note that parts in common with the process of automatically selecting a person image shown in FIG. 8 are denoted by the same step numbers, and a detailed description thereof will be omitted.

The third embodiment shown in FIG. 8 is configured to update the importance values of person images registered in a database each time a picture is taken. In contrast, the fourth embodiment shown in FIG. 9 is configured to further prepare a subdatabase, update the importance values of person images registered in the subdatabase each time a picture is taken, and, when a new person image is taken, generate a person image by extracting a person region from the new person image and register the person image.

FIG. 9 is different from FIG. 8 in that steps S34', S36', and S40' are associated with the subdatabase while steps S34, S36, and S40 are associated with a database. The other steps, however, are the same as those in FIG. 8.

If it is determined in step S36' that the ith face is unregistered in the subdatabase, the flow shifts to step S50. In step S50, the ith person region is extracted from a taken image and is registered as a new person image in the subdatabase.

With this operation, a new person image is registered in the subdatabase, and the importance values of person images registered in the subdatabase are updated in the same manner as in the third embodiment shown in FIG. 8 each time a picture is taken.

Ones whose importance values are not less than a certain value (or ones with the top predetermined number of importance values) of person images registered in the subdatabase in the above-described manner are formally registered in the database on a regular basis.

Among person images formally registered in the database, a user manually selects ones used for insertion while advancing or reversing person images in the database one frame at a time or displaying the index to the person images. Note that a person image to be inserted may be automatically selected in the same manner as in the third embodiment.

Since an image for insertion such as a person image not desired to be registered in the database may be automatically registered, it is preferable to provide a device which allows a user to manually delete the automatically registered image for insertion.

Fifth Embodiment

Even if a person image is inserted into a background image at an appropriate position in an appropriate size and orientation, an unnatural image may be generated when there is a gap in how illumination is provided (e.g., brightness and color) between the background image and the person image.

For example, assume that only person images with a tinge of yellow taken under tungsten light are registered in a database. If the person image is inserted into a picture taken under sunlight, an image which provides some sense of incongruity is generated.

For this reason, a fifth embodiment according to the present invention is configured to estimate a light source of a picture using object recognition and insert a person image to be inserted into the picture after correcting the lighting situation of the person image to suit the light source of the picture.

Figure 10:
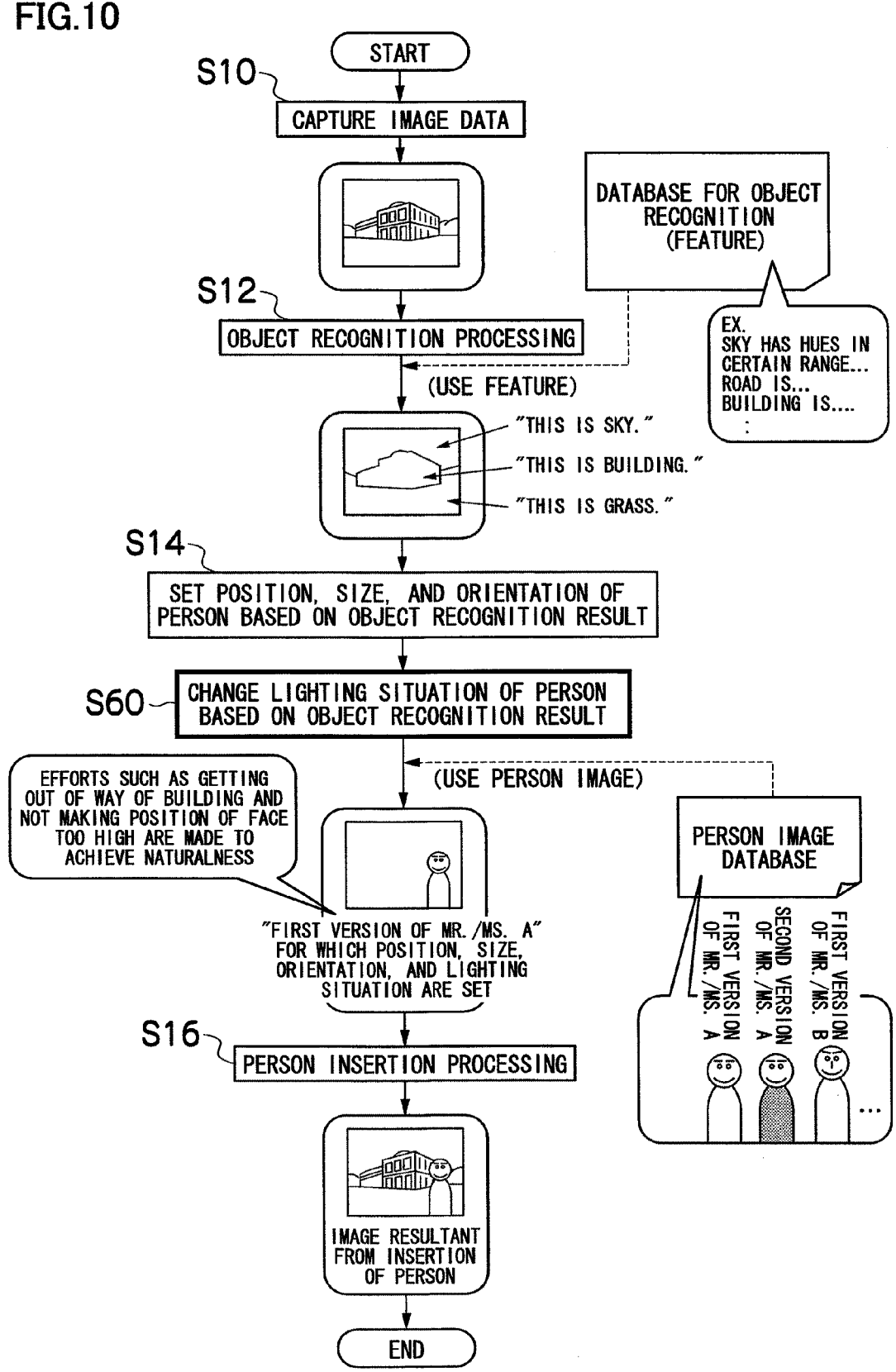
FIG. 10 is a flow chart showing the flow of overall processing of a fifth embodiment according to the present invention.

FIG. 10 is a flow chart showing the flow of overall processing of the fifth embodiment according to the present invention. Note that, in FIG. 10, steps of performing the same processes as those in the first embodiment shown in FIG. 2 are denoted by the same step numbers, and a detailed description thereof will be omitted.

The fifth embodiment shown in FIG. 10 is different from the first embodiment in that a process in step S60 is added.

In step S60, the lighting situation of an image captured in step S10 is learned of on the basis of the result of performing object recognition on the image, and the lighting situation of a person image to be inserted is changed to suit that of the image.

Figure 11:
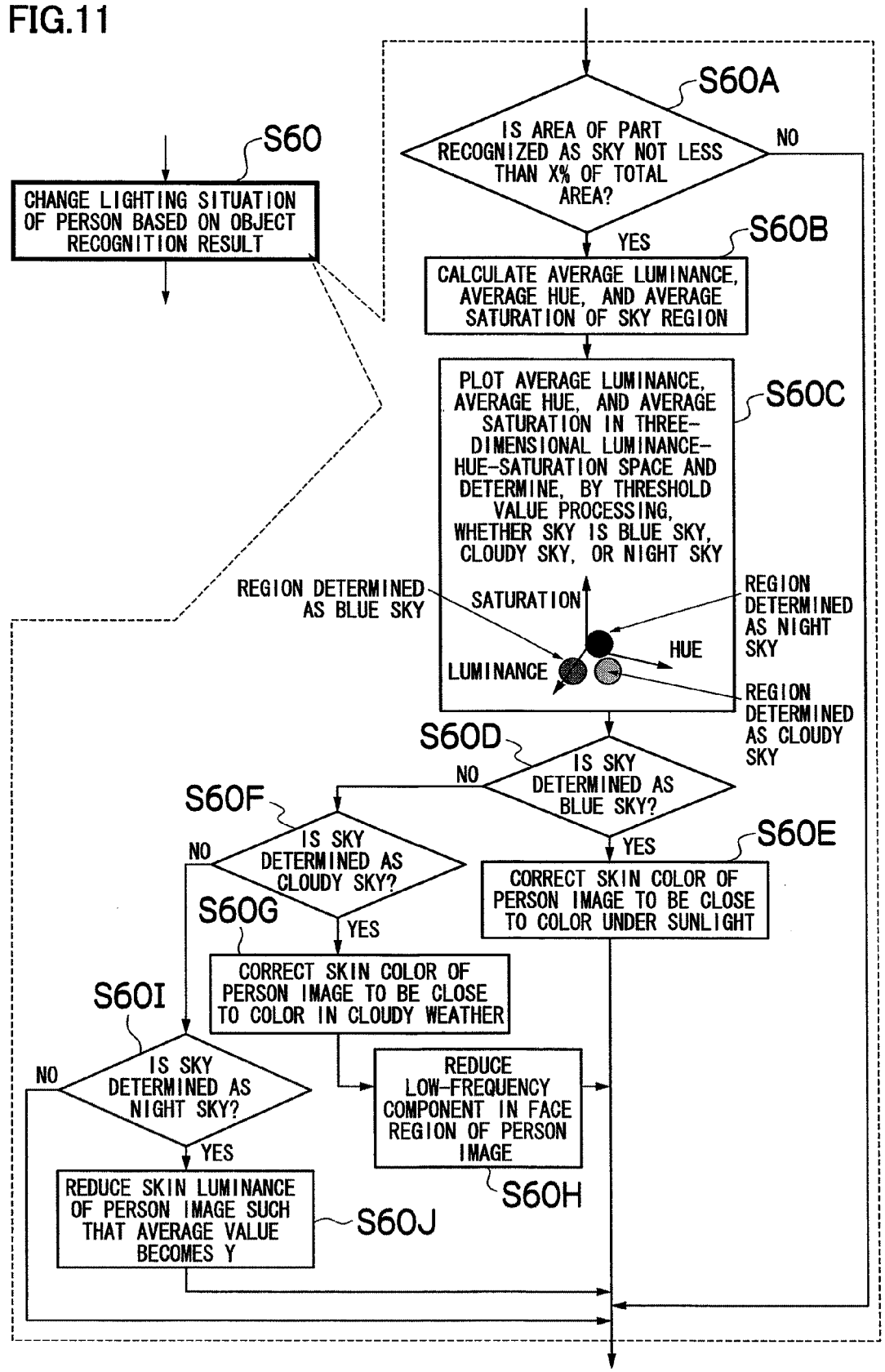
FIG. 11 is a flow chart showing the details of step S60 in FIG. 10.

FIG. 11 is a flow chart showing the details of step S60 in FIG. 10.

As shown in FIG. 11, it is determined whether the area of a part which is recognized as the sky when a captured image is subjected to object recognition is not less than X % of the total area (step S60A). Since a lighting situation is determined using a sky-related object (e.g., a blue sky, a cloudy sky, or a night sky) which is believed to be strongly associated with how illumination is provided in this embodiment, the image needs to include a sky region which is not less than a specific percent.

If the image includes a sky region which is not less than the specific percent (X %), the average luminance, average hue, and average saturation of the sky region are calculated (step S60B). The average luminance, average hue, and average saturation are plotted in a three-dimensional luminance-hue-saturation space, and it is determined by threshold value processing whether the sky of the sky region is a blue sky, a cloudy sky, or a night sky (step S60C).

If it is determined that the sky is a blue sky (step S60D), the skin color of the person image is corrected to be close to a color under sunlight (e.g., a color temperature of 5,600 K) (step S60E).

If it is determined that the sky is a cloudy sky (step S60F), the skin color of the person image is corrected to be close to a color in cloudy weather (e.g., a color temperature of 7,500 K) (step S60G). The process of reducing low-frequency components within a face region of a person image to be inserted on the assumption that there is almost no contrast (shades) within a face region which may appear when sunlight diagonally strikes a face (step S60H) is more effective.

If it is determined that the sky is a night sky (step S60I), the process of reducing the average skin luminance to a predetermined luminance Y to produce the feeling that the image is taken with the night sky in the background (step S60J).

Note that a method for fuzzily performing spectroscopic correction in consideration of both the belongingness to a blue sky and the belongingness to a cloudy sky may be adopted instead of distinguishing between a blue sky and a cloudy sky by a threshold value as described above. Alternatively, a determination as to whether the sky is a sunset sky may be made.

Since determination of the type of a light source and the like are performed for white balance correction at the time of photography, it is also possible to correct the color of a person image on the basis of the type, color temperature, and the like of the light source.

As described above, since a person image is inserted into a background image after estimating a light source using the result of performing object recognition on the sky in the background image and correcting the lighting situation of the person image to suit the light source, a person image for insertion which is more natural in terms of image quality is obtained.

Sixth Embodiment

It is regarded as desirable to try not to use an image of a lower body part (in particular, a foot part) as a person image to be inserted as much as possible at the time of inserting the person image into a background image. This is because if the whole body including a foot part is inserted, the absence of a shadow may appear unnatural in some pictures.

Advance preparation of a person image with a shadow is also conceivable. However, since the length and orientation of a shadow strongly depend on weather and place, the preparation is extremely technically difficult.

For this reason, a sixth embodiment according to the present invention is configured to be capable of inserting a person image with the whole body without fearing the problem of the absence of a shadow if it is found that a shadow is unlikely to appear in the scene of a background image.

Figure 12:
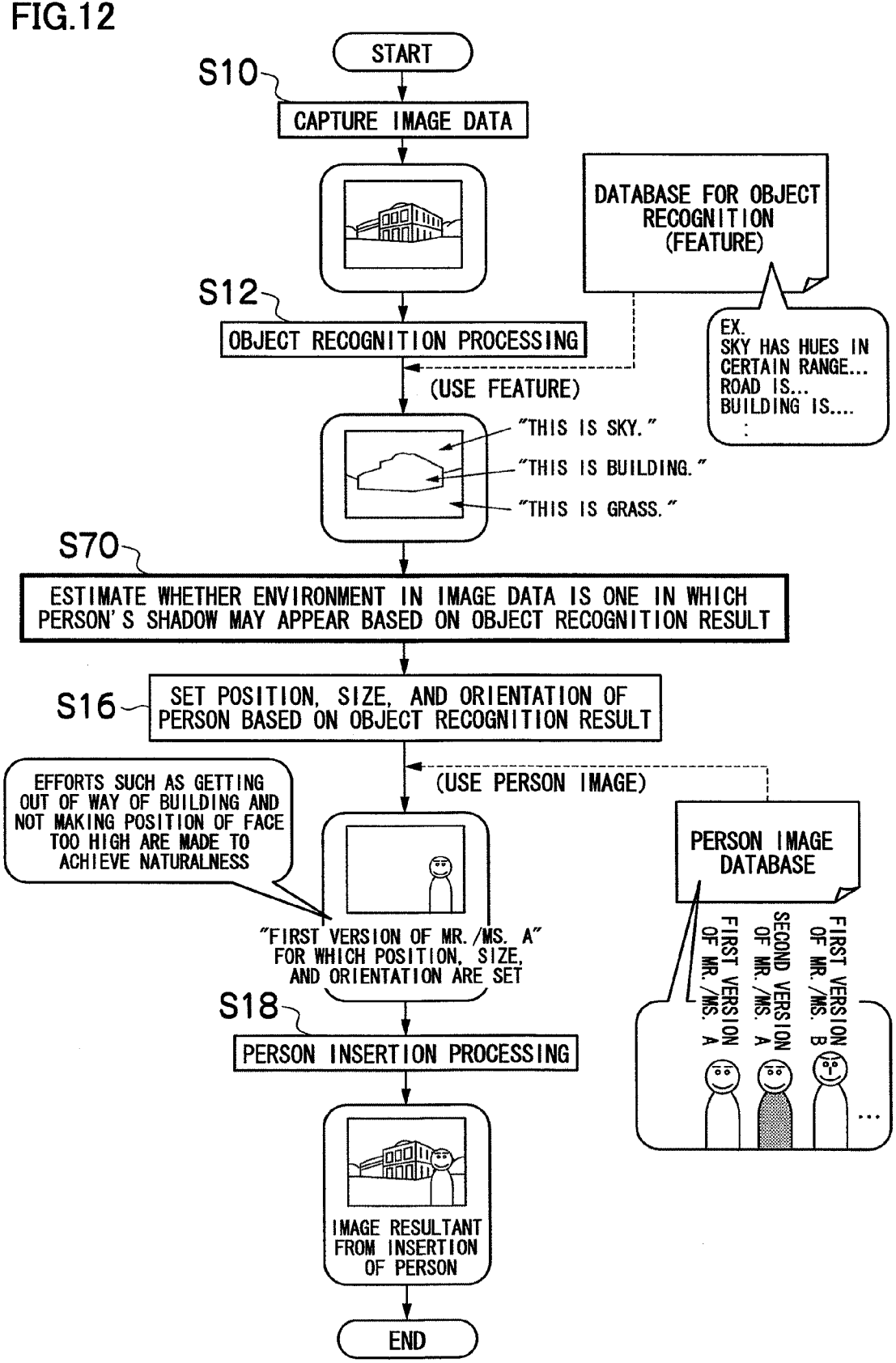
FIG. 12 is a flow chart showing the flow of overall processing of a sixth embodiment according to the present invention.

FIG. 12 is a flow chart showing the flow of overall processing of the sixth embodiment according to the present invention. Note that, in FIG. 12, steps of performing the same processes as those in the first embodiment shown in FIG. 2 are denoted by the same step numbers, and a detailed description thereof will be omitted.

The sixth embodiment shown in FIG. 12 is different from the first embodiment in that a process in step S70 is added.

In step S70, it is estimated whether an environment in an image captured in step S10 is one in which a person's shadow may appear on the basis of the result of performing object recognition on the image. The result of the estimation is reflected in setting in person image processing in step S16 and the like.

Figure 13:
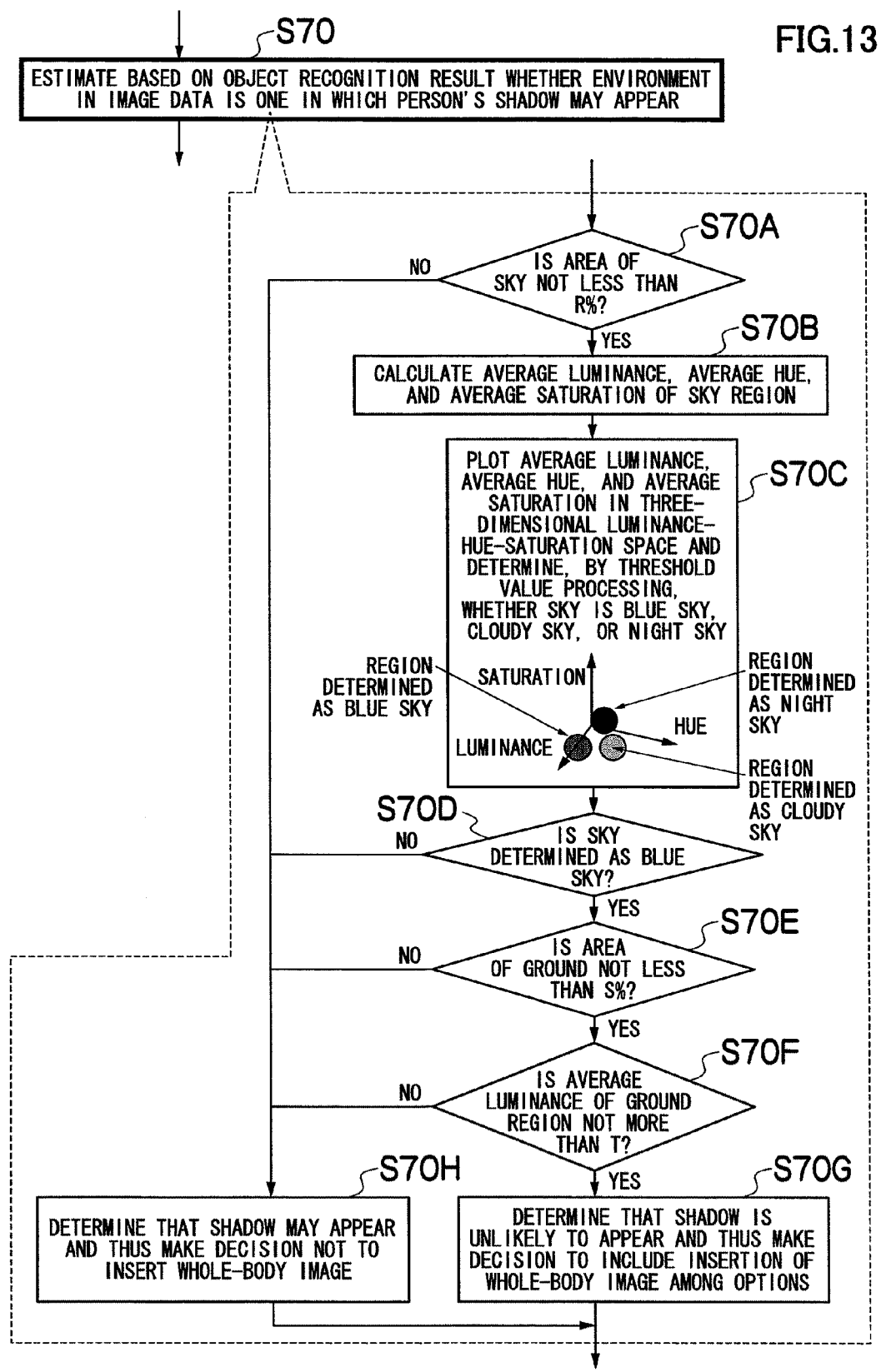
FIG. 13 is a flow chart showing the details of step S70 in FIG. 12.

FIG. 13 is a flow chart showing the details of step S70 in FIG. 12.

In the flow chart, whether an environment is one in which a person's shadow may appear is estimated on the basis of the following assumptions:

(1) a shadow is highly likely to appear in the case of a blue sky, a shadow is less likely to appear in the case of a cloudy sky, and a shadow cannot be said to be less likely to appear in the case of a night sky due to the possibility of an approximation to a point light source such as a street lamp;

(2) if the sky is a cloudy sky, and the ground is bright, the ground may be under some intense light, and the possibility of a shadow's appearing is left; and (3) if the sky is a cloudy sky, and the ground is dark to a certain degree, a shadow can be considered to be less likely to appear.

In the flow chart shown in FIG. 13, an environment in which the sky is a cloudy sky, and the ground is dark to a certain degree is determined as an environment in which a person's shadow is unlikely to appear while the other environments are determined as environments in which a shadow may appear.

More specifically, in FIG. 13, it is determined whether the area of a part recognized as the sky by performing object recognition on a captured image is not less than X % of the total area (step S70A). If the image includes a sky region which is not less than a specific percent (X %), the average luminance, average hue, and average saturation of the sky region are calculated (step S70B). The average luminance, average hue, and average saturation are plotted in a three-dimensional luminance-hue-saturation space, and it is determined by threshold value processing whether the sky of the sky region is a blue sky, a cloudy sky, or a night sky (step S70C).

If it is determined that the sky is a cloudy sky (step S70D), it is then determined whether the area of the ground is not less than S % of the total area (step S70E). If the image includes a ground region which is not less than a specific percent (S %), it is further determined whether the average luminance of the ground region is not more than a predetermined luminance T (step S70F).

If it is determined that the average luminance of the ground region is not more than the predetermined luminance T, it is determined that a shadow is unlikely to appear in an environment in the captured image, and the decision to include insertion of a person image with the whole body among options is made (step S70G). This does not mean the decision to always insert a person image with the whole body but means that a whole-body image can also be inserted, which increases person image options.

In the case of the other environments, it is determined that the environment is one in which a shadow may appear, and the decision not to include a person image with the whole body among options for an image for insertion is made (step S70H).

As described above, since whether consideration for the absence of a shadow is required is determined using object recognition, it is possible to insert a person image with the whole body.

Note that if only a whole-body image of a person is stored as an image for insertion in a database, the image may be converted into an upper-body image by removing an image of a lower body part (in particular, a foot part). The determination shown in FIG. 13 as to whether a shadow appears is illustrative only, and the present invention is not limited to this embodiment.

Seventh Embodiment

Even if a person image is inserted into a background image at an appropriate position in an appropriate size and orientation, an image with poor image quality may be generated when the sharpness of the background image does not coincide with that of the person image.

More specifically, assume that an image for insertion registered in a database is in focus. Even in this case, if the image for insertion is inserted into a background image after being enlarged, a resultant image is expected to be similar to a rear-focused (a phenomenon in which not a nearby person but a distant background is in focus) image.

For this reason, a seventh embodiment according to the present invention is configured to change the resolution or frequency characteristic of a background image or an image for insertion or abandon insertion after checking an enlargement ratio at the time of inserting the image for insertion, thereby preventing an image similar to a rear-focused image from being generated.

Figure 14:
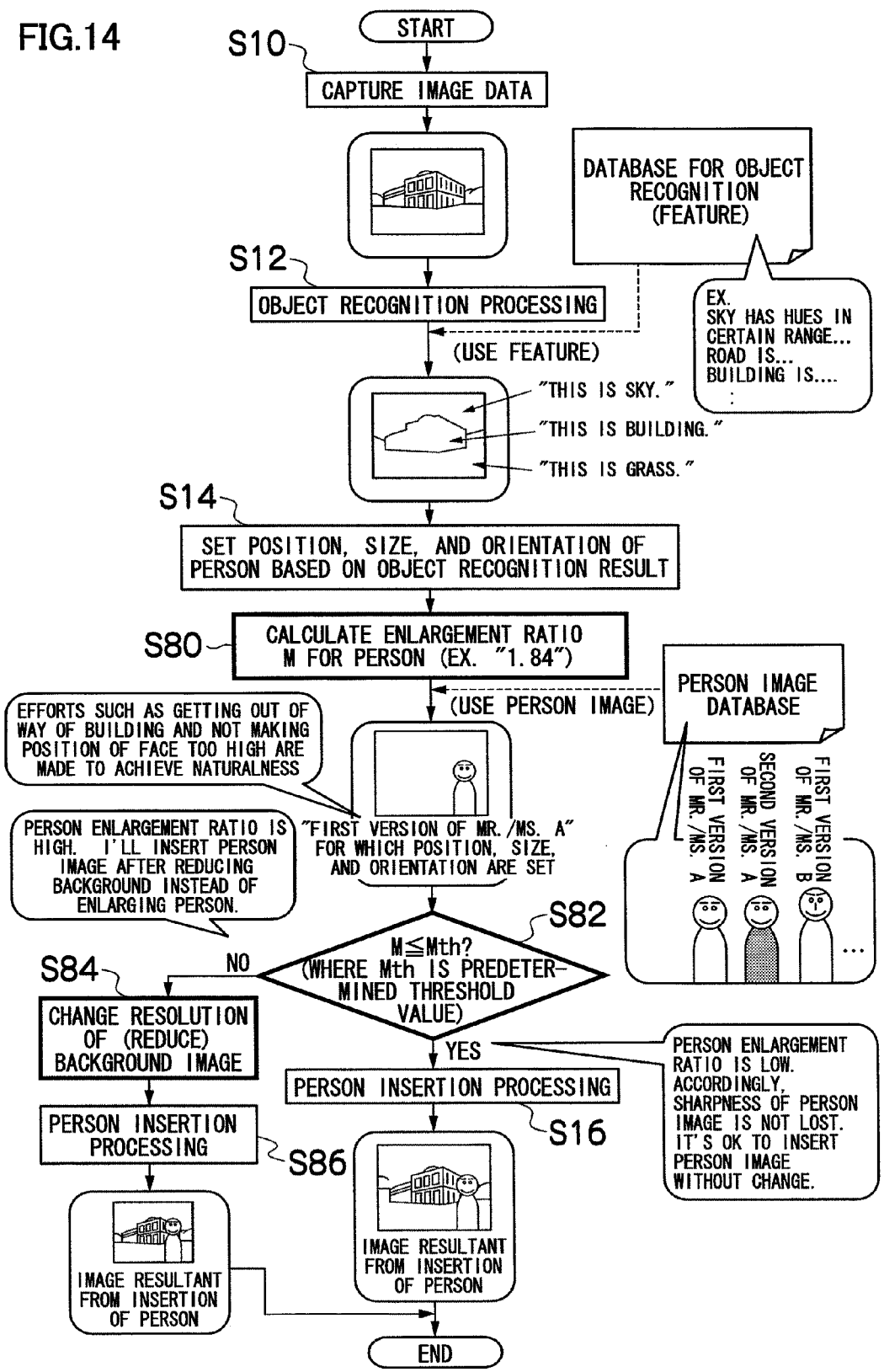
FIG. 14 is a flow chart showing the flow of overall processing of a seventh embodiment of the present invention.

FIG. 14 is a flow chart showing the flow of overall processing of a seventh embodiment according to the present invention. Note that, in FIG. 14, steps of performing the same processes as those of the first embodiment shown in FIG. 2 are denoted by the same step numbers, and a detailed description thereof will be omitted.

The seventh embodiment shown in FIG. 14 is different from the first embodiment in that processes in steps S80 to S86 are added.

In step S80, an enlargement ratio M for a person image is calculated from a size for a person image to be inserted set in step S14 and the size of a person image stored in a database. Note that the resolution of a background image is equal or analogous to that of a person image stored in the database.

In step S82, it is judged whether the enlargement ratio M for a person image is not more than a predetermined threshold value Mth (e.g., 1.25). If the enlargement ratio M is not more than the threshold value Mth, since the apparent sharpness of the person image is expected not to be lost after enlargement, the process of inserting the person image is performed as is conventionally done (step S16).

On the other hand, if the enlargement ratio M for a person image is larger than the threshold value Mth, the apparent sharpness of the person image is expected to be lost after enlargement. In this case, any one of the following processes (1) to (3) is performed in step S84:

(1) the process of inserting the person image after reducing the background image instead of enlarging the person image (steps S84 and S86);

(2) the process of blurring (changing the frequency characteristic of) the background image using a low-pass filter or the like and inserting the person image after causing the sharpnesses of both the images to coincide with each other; and (3) the process of enlarging the person image by the enlargement ratio having the threshold value Mth and inserting the person image after reducing the background image to compensate for a shortfall in enlargement ratio.

Although the case (1) described above suffers from the smaller size of a final image, it can prevent a rear focus state and obtain a person image for insertion which is good in terms of image quality. In the case (2) described above, although the size of a final image is unchanged from the original image, the final image is a person-inserted image in which a person and a background are both slightly blurred. In the case of (3) described above, the size of the final image is intermediate between those in the cases (1) and (2) described above, and the resolution is better than that in the case (3) described above.

Note that a second threshold value for an enlargement ratio may be set, and a device which cancels insertion of a person image if the enlargement ratio for a person image is extremely large (e.g., 10) may be provided.

If the resolution of the background image does not coincide with that of a person image stored in the database, the ratio between their resolutions (the resolution of the background image/the resolution of the person image) is multiplied by the enlargement ratio, and the above-described determination is performed using an enlargement ratio which is the product.

As described above, by performing the process of causing the resolution and sharpness of a person image to coincide with those of a background image and the like according to an enlargement ratio at the time of inserting the person image, it is possible to prevent an image similar to a "rear-focused" image from being generated.

<Modifications>

Although the above embodiments have been described taking the digital camera 10 as an example, the present invention is not limited to this. A personal computer or the like may be equipped with functions of an image processing apparatus according to the present invention. The present invention may be achieved by appropriately combining the above-described embodiments. An image for insertion is not limited to a person image, and a pet image or the like may be used instead.

Although an image processing apparatus, an imaging apparatus (digital camera), and an image processing method according to the present invention have been described in detail, the present invention is not limited to the above-described examples. It is to be understood that various improvements and modifications may be made without departing from the spirit and scope of the present invention.

What is claimed is:

1. An image processing apparatus, comprising:
a storage device which stores an image for insertion;
an image acquisition device which acquires a background image forming a background of the image for insertion;
an object recognition device which recognizes at least one object from the acquired background image and acquires object information including a position of the object;

an image processing device which image-processes the image for insertion based on the object information to appropriately combine the image for insertion into the background image; and an image synthesis device which combines the processed image for insertion into the background image.

2. The image processing apparatus according to claim 1, wherein the storage device stores a photographed image of a person as the image for insertion.

3. The image processing apparatus according to claim 1, wherein the object recognition device recognizes at least one object of objects with a ground attribute, including a road, soil, and sand, objects with a plant attribute, including a forest, a tree, and grass, objects with a water attribute, including the sea and a river, objects with an artificial construction attribute, including a building and a wall, and objects with a sky attribute, including a blue sky and a night sky.

4. The image processing apparatus according to claim 1, wherein the image processing device subjects the image for insertion to image processing for at least one of a position at which the image for insertion is to be inserted into the background image, a size of the image for insertion, and an orientation of the image for insertion based on the object information.

5. The image processing apparatus according to claim 4, further comprising: a specification device which specifies, by a user operation, at least one of whether to allow insertion of the image for insertion, an image to be selected as the image for insertion, the position at which the image for insertion is to be inserted, the size, and the orientation.

6. The image processing apparatus according to claim 1, wherein
the storage device stores a plurality of images for insertion, and
the apparatus further comprises:
an evaluation device which assigns an importance value to each of the plurality of images for insertion using a past photography history; and
an automatic selection device which automatically selects one to be actually inserted of the plurality of images for insertion based on the importance values assigned to the respective images for insertion by the evaluation device.

7. The image processing apparatus according to claim 6, wherein the evaluation device assigns the importance value to each of the images for insertion based on at least one probability of a probability of an image including the image for insertion being taken, a probability of the image for insertion being at a center of an image, and a probability of the image for insertion facing toward a front of a viewer.

8. The image processing apparatus according to claim 6, further comprising:
a presentation device which presents an image for insertion selected by the automatic selection device to a user; and
a specification device which specifies at least whether to insert the presented image for insertion.

9. The image processing apparatus according to claim 1, further comprising: a device which extracts a predetermined region from an input image and stores an image of the extracted region as the image for insertion in the storage device.

10. The image processing apparatus according to claim 9, wherein the device which stores the image for insertion in the storage device determines, as the image for insertion, a candidate for the image for insertion based on at least one of a probability of an image including the candidate for the image for insertion being taken, a probability of the candidate for the image for insertion being at a center of an image, and a probability of the candidate for the image for insertion facing toward a front of a viewer and stores the determined image for insertion in the storage device.

11. The image processing apparatus according to claim 1, further comprising: a deletion device which deletes an image for insertion stored in the storage device in accordance with a directive input from a user.

12. The image processing apparatus according to claim 1, further comprising:
a lighting situation determination device which determines a lighting situation of the background image, wherein
the image processing device changes a lighting situation of the image for insertion based on a result of the determination.

13. The image processing apparatus according to claim 12, wherein the lighting situation determination device determines the lighting situation of the background image based on an object with the sky attribute recognized by the object recognition device.

14. The image processing apparatus according to claim 12, wherein the change of the lighting situation of the image for insertion is a change in at least one of brightness, color, and shade of the image for insertion.

15. The image processing apparatus according to claim 1, further comprising:
an estimation device which estimates whether an environment in the background image is an environment in which a shadow is likely to appear, wherein
the image processing device performs one of selecting an image for insertion for which presence or absence of a shadow is hardly-noticeable as the image for insertion from the storage device and image-processing of the image for insertion such that presence or absence of a shadow is unnoticeable if it is estimated that the environment in the background image is an environment in which a shadow is likely to appear.

16. The image processing apparatus according to claim 15, wherein the estimation device estimates whether the environment in the background image is an environment in which a shadow is likely to appear, based on at least one object of an object with the ground attribute and an object with the sky attribute recognized by the object recognition device.

17. The image processing apparatus according to claim 1, further comprising:
a resolution determination device which determines resolutions of the background image and image for insertion, wherein
the image processing device performs image processing for causing the resolutions of the background image and image for insertion to coincide with each other.

18. The image processing apparatus according to claim 17, wherein
the resolution determination device comprises a device which calculates an enlargement ratio for the image for insertion, and
the image processing device performs one of reducing an image size of the background image and changing a frequency characteristic of the background image if the calculated enlargement ratio for the image for insertion exceeds a predetermined value.

19. The image processing apparatus according to claim 17, wherein
the resolution determination device comprises a device which calculates an enlargement ratio for the image for insertion, and
the apparatus further comprises a switching device which switches whether to combine the image for insertion into the background image based on the calculated enlargement ratio for the image for insertion.

20. An imaging apparatus, comprising:
an imaging device; and
an image processing apparatus according to claim 1,
wherein the image processing apparatus acquires an image picked up by the imaging device as the background image.

21. An imaging apparatus, comprising:
an imaging device;
a face detection device which detects a human face from an image picked up by the imaging device; and
an image processing apparatus according to claim 1,
wherein the image acquisition device acquires, as the background image, an image in which a human face is not detected by the face detection device, and
the image processing apparatus operates only if a human face is not detected by the face detection device.

22. An imaging apparatus, comprising:
an imaging device;
a mode selection device which selects an image insertion photography mode of inserting the image for insertion into an image picked up by the imaging device; and
an image processing apparatus according to claim 1, wherein
the image acquisition device acquires an image picked up by the imaging device as the background image if the image insertion photography mode is selected, and
the image processing apparatus operates only if the image insertion photography mode is selected.

23. The imaging apparatus according to claim 20, further comprising:
a mode selection device which selects an image registration photography mode of registering the image for insertion, wherein
when the image registration photography mode is selected, the image picked up by the imaging device is stored as the image for insertion in the storage device.

24. The imaging apparatus according to claim 20, further comprising:
a synthesis determination device which determines whether to combine the image for insertion into the image picked up by the imaging device, wherein the image processing apparatus is operated only when it is determined that the image for insertion is to be combined.

25. The imaging apparatus according to claim 24, wherein the synthesis determination device determines whether to combine the image for insertion based on at least one of an object distance of the image picked up by the imaging device, an angle which a photographing optical axis at the time of photography of the image picked up by the imaging device forms with a vertical direction, and a photography mode selected at the time of photography.

26. An image processing method, comprising the steps of:
a step of preparing an image for insertion;
a step of acquiring a background image forming a background of the image for insertion;
a step of recognizing at least one object from the acquired background image and acquiring object information including a position of the object;
a step of performing image processing on the image for insertion to appropriately combine the image for insertion into the background image on the basis of the object information; and
a step of combining the processed image for insertion into the background image.

27. The image processing method according to claim 26, wherein the image for insertion is a photographed image of a person.

28. The image processing method according to claim 26, wherein the object recognition comprises recognizing at least one object of objects with a ground attribute, including a road, soil, and sand, objects with a plant attribute, including a forest, a tree, and grass, objects with a water attribute, including the sea and a river, objects with an artificial construction attribute, including a building and a wall, and objects with a sky attribute, including a blue sky and a night sky.

29. The image processing method according to claim 26, wherein the step of performing the image processing comprises subjecting the image for insertion to image processing for at least one of a position at which the image for insertion is to be inserted into the background image, a size of the image for insertion, and an orientation of the image for insertion based on the object information.

* * * * *